United States Patent
Ryu

(10) Patent No.: US 12,199,457 B2
(45) Date of Patent: Jan. 14, 2025

(54) BATTERY MANAGEMENT CIRCUIT AND ENERGY STORAGE DEVICE

(71) Applicant: Nuvoton Technology Corporation Japan, Kyoto (JP)

(72) Inventor: Takashi Ryu, Kyoto (JP)

(73) Assignee: NUVOTON TECHNOLOGY CORPORATION JAPAN, Kyoto (JP)

(*) Notice: Subject to any disclaimer, the term of this patent is extended or adjusted under 35 U.S.C. 154(b) by 310 days.

(21) Appl. No.: 17/570,176

(22) Filed: Jan. 6, 2022

(65) Prior Publication Data

US 2022/0131390 A1    Apr. 28, 2022

Related U.S. Application Data

(63) Continuation of application No. PCT/JP2020/027345, filed on Jul. 14, 2020.

(30) Foreign Application Priority Data

Jul. 18, 2019    (JP) .................. 2019-133098

(51) Int. Cl.
    *H02J 7/00*           (2006.01)
    *H01M 10/42*          (2006.01)
    (Continued)

(52) U.S. Cl.
    CPC ......... *H02J 7/0014* (2013.01); *H01M 10/425* (2013.01); *H01M 10/44* (2013.01);
    (Continued)

(58) Field of Classification Search
    CPC .............................. H02J 7/0014; H02J 7/0024
    See application file for complete search history.

(56) References Cited

U.S. PATENT DOCUMENTS 5,710,504 A    1/1998    Pascual et al.
10,587,126 B2*    3/2020    Ozawa .................. H02J 7/0014
(Continued)

FOREIGN PATENT DOCUMENTS

JP       H10-164768 A    6/1998
JP       2000-511398 A    8/2000
(Continued)

OTHER PUBLICATIONS

International Search Report issued in corresponding International Patent Application No. PCT/JP2020/027345, dated Aug. 18, 2020, with English translation.

(Continued)

*Primary Examiner* — Richard Isla
*Assistant Examiner* — Sadia Kousar
(74) *Attorney, Agent, or Firm* — Rimon P.C.

(57) ABSTRACT

A battery management circuit is a battery management circuit that manages an energy storage device including battery cells and capacitors, and includes: a first switching circuit that connects a first capacitor among the capacitors and a first battery cell among the battery cells in parallel; a second switching circuit that connects the first capacitor and two or more series-connected battery cells other than the first battery cell among the battery cells in parallel; and a control circuit that performs a first control of repeatedly switching between the connection by the first switching circuit and the connection by the second switching circuit.

13 Claims, 20 Drawing Sheets

(51) Int. Cl.
  H01M 10/44  (2006.01)
  H02J 7/34  (2006.01)
(52) U.S. Cl.
  CPC ............ *H02J 7/0024* (2013.01); *H02J 7/345* (2013.01); *H01M 2010/4271* (2013.01)

(56) References Cited

U.S. PATENT DOCUMENTS

| | | | | |
|---|---|---|---|---|
| 2012/0286578 A1* | 11/2012 | Uno | ...................... | H02J 7/0024 307/77 |
| 2019/0285669 A1* | 9/2019 | Furukawa | ............. | H01M 10/48 |
| 2020/0059106 A1* | 2/2020 | Karlsson | ............. | H01M 10/425 |

FOREIGN PATENT DOCUMENTS

| | | |
|---|---|---|
| JP | 2000-270483 A | 9/2000 |
| JP | 2015-37339 A | 2/2015 |
| WO | 97/44877 A1 | 11/1997 |

OTHER PUBLICATIONS

Japanese Office Action dated Aug. 20, 2024 issued in the corresponding Japanese Patent Application No. 2021-533074.

* cited by examiner

BATTERY MANAGEMENT CIRCUIT AND ENERGY STORAGE DEVICE

CROSS REFERENCE TO RELATED APPLICATIONS

This is a continuation application of PCT International Application No. PCT/JP2020/027345 filed on Jul. 14, 2020, designating the United States of America, which is based on and claims priority of Japanese Patent Application No. 2019-433098 filed on Jul. 18, 2019, The entire disclosures of the above-identified applications, including the specifications, drawings and claims are incorporated herein by reference in their entirety.

FIELD

The present disclosure relates to an energy storage device having battery cells and a battery management circuit that manages the energy storage device.

BACKGROUND

Patent Literature (PTL) 1 discloses a voltage balancing process of balancing the voltages of series-connected battery cells.

CITATION LIST

Patent Literature

PTL 1: Japanese Unexamined Patent Application Publication (Translation of PCT Application) No. 2000-511398

SUMMARY

Technical Problem

With the conventional technology mentioned above, however, a problem is that it takes a long time, in some cases, to balance the voltages of battery cells composing an energy storage device.

In view of the above, the present disclosure provides a battery management circuit and an energy storage device that shorten a time required for the balancing of cell voltages in a voltage balancing process.

Solution to Problem

In order to solve the above problem, a battery management circuit according to an aspect of the present disclosure is a battery management circuit that manages an energy storage device including battery cells and capacitors, and includes: a first switching circuit that connects a first capacitor and a first battery cell in parallel, the first capacitor being included in the capacitors, the first battery cell being included in the battery cells; a second switching circuit that connects the first capacitor and two or more series-connected battery cells other than the first battery cell in parallel, the two or more series-connected battery cells being included in the battery cells; and a control circuit that performs a first control of repeatedly switching between the connection by the first switching circuit and the connection by the second switching circuit.

Moreover, an energy storage device according to an aspect of the present disclosure includes the battery management circuit, the battery cells, and the capacitors which are described above.

Advantageous Effects

With the battery management circuit and the energy storage device according to the present disclosure, it is possible to shorten a time required for the balancing of cell voltages in a voltage balancing process.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS (Underlying Knowledge Forming Basis of the Present Disclosure)

The inventors have found the following problem regarding an energy storage device that performs the voltage balancing process mentioned in the section of "Background".

Figure 20:
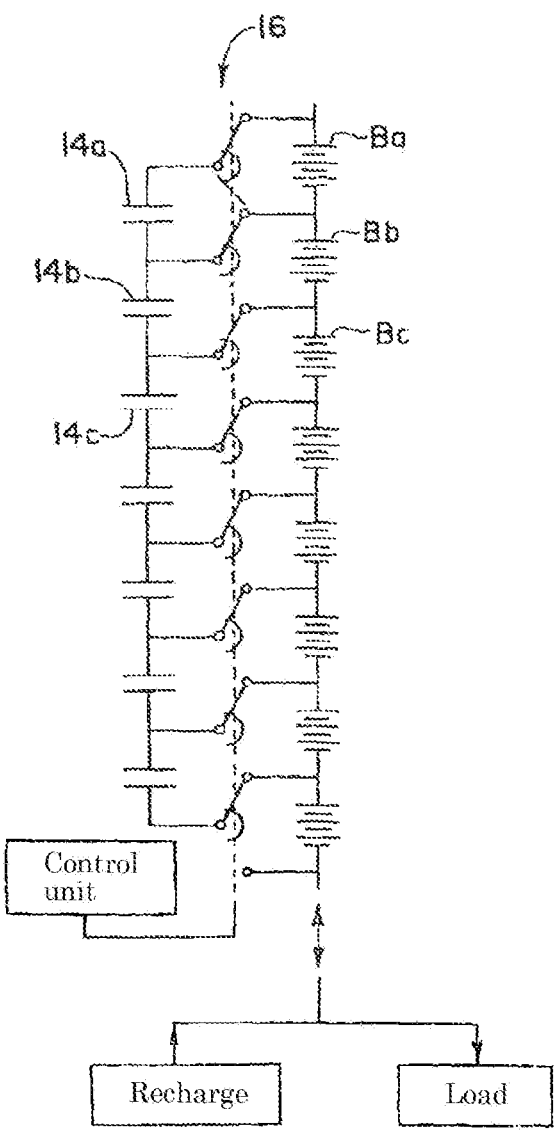
FIG. 20 is a circuit diagram illustrating a configuration of an energy storage device disclosed in PTL 1.

FIG. 20 is a circuit diagram illustrating a configuration of an energy storage device disclosed in PTL 1.

In the diagram, switches 16 each alternately switch between a first state and a second state several times. For example, capacitor 14a is parallel connected to battery cell Ba in the first state and is parallel connected to battery cell Bb in the second state, Capacitor 14b is parallel connected to battery cell Bb in the first state and is parallel connected to battery cell Bc in the second state. Each of the other capacitors is connected to a corresponding one of the battery cells in the first or second state in the same manner.

Accordingly, a battery cell having a higher voltage out of two neighboring battery cells charges, via a capacitor, a battery cell having a lower voltage. Thus, the energy storage device illustrated in FIG. 20 cyclically switches between the first state and the second state in each of which each of the capacitors is connected to a different one of the battery cells in parallel, to balance the voltages of the battery cells.

However, if series-connected battery cells include a battery cell with a particularly low voltage due to, for instance, a current leakage leaking from the battery cell, which is greater in amount than any of the other battery cells, it takes a lot of time to charge that battery cell. As a result, a problem is that a time required for the voltage balancing of all the battery cells gets longer.

In order to solve such a problem, a battery management circuit according to an aspect of the present disclosure is a battery management circuit that manages an energy storage device including battery cells and capacitors, and includes: a first switching circuit that connects a first capacitor and a first battery cell in parallel, the first capacitor being included in the capacitors, the first battery cell being included in the battery cells; a second switching circuit that connects the first capacitor and two or more series-connected battery cells other than the first battery cell in parallel, the two or more series-connected battery cells being included in the battery cells; and a control circuit that performs a first control of repeatedly switching between the connection by the first switching circuit and the connection by the second switching circuit.

Moreover, an energy storage device according to an aspect of the present disclosure includes the aforementioned battery management circuit; the aforementioned battery cells; and the aforementioned capacitors.

Accordingly, a voltage higher than the voltage of one battery cell is applied from the first capacitor to the first battery cell. Therefore, the battery management circuit and the energy storage device can increase a charging current particularly for the first battery cell, thereby shortening a time required for voltage balancing.

Hereinafter, embodiments of the present disclosure will be described with reference to the drawings, Note that each of the embodiments describes a specific example of the present disclosure. The numerical values, shapes, materials, elements, the arrangement and connection of the elements, steps, driving timings, etc. described in the following embodiments are mere examples, and are not intended to limit the present disclosure. Among elements described in the following embodiments, those not recited in any one of the independent claims that indicate the broadest concepts are described as optional elements. Moreover, the drawings are not necessarily accurate illustrations. Duplicated description of substantially identical elements in the drawings may be omitted or simplified.

[1. Configuration]

Figure 1:
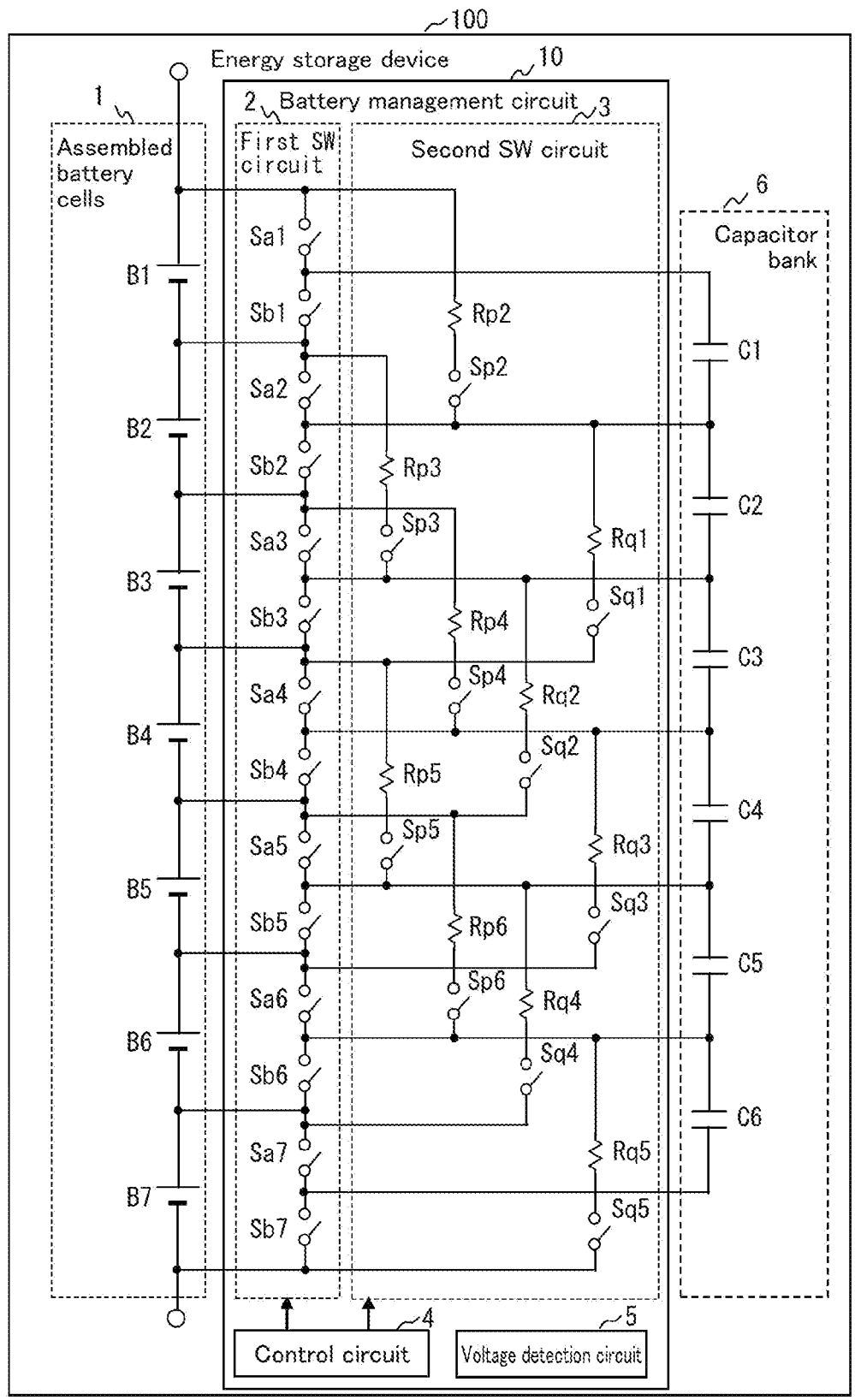
FIG. 1 is a circuit diagram illustrating an example of a configuration of an energy storage device according to an embodiment.

First, a configuration of energy storage device 100 will be described,

FIG. 1 is a circuit diagram illustrating an example of a configuration of energy storage device 100 according to an embodiment.

In FIG. 1, energy storage device 100 includes assembled battery cells 1, capacitor bank 6, and battery management circuit 10.

Assembled battery cells 1 include several (m number of) energy storage means (as represented by battery cells B1 to B7) that are connected in series. Although FIG. 1 illustrates the case where m=7, the number of battery cells in assembled battery cells 1 is not limited to seven. Each battery cell is, for example, a lithium-ion battery, but may be another type of battery such as a nickel metal hydride battery. Each battery cell may be a series-connected energy storage cell such as a lithium-ion capacitor. Assembled battery cells 1 are connected to a load and a charging circuit. The load is, for example, the motor of an HEV or an EV, but is not limited to such examples.

Capacitor bank 6 has capacitors C1 to C6. Capacitor bank 6 is composed of six capacitors that are connected in series and are less in number by one than the battery cells in assembled battery cells 1.

Battery management circuit 10 manages energy storage device 100 having battery cells B1 to B7 and capacitors C1 to C6, Battery management circuit 10 therefore includes first switching circuit 2, second switching circuit 3, control circuit 4, and voltage detection circuit 5. Note that first switching circuit 2 and second switching circuit 3 are respectively denoted as first SW circuit and second SW circuit in FIG. 1.

First switching circuit 2 is capable of connecting, in parallel, a first capacitor among the capacitors and a first battery cell among the battery cells, and connecting a second capacitor among the capacitors to the first battery cell in parallel. The first battery cell here may be, for example, a battery cell having an output voltage lower than a predetermined value among battery cells B1 to B7 or a battery cell selected among battery cells B1 to B7. Each of the first capacitor and the second capacitor is a capacitor to which the first battery cell is connected in parallel in a pair by first switching circuit 2. In FIG. 1, when the first battery cell is battery cell B4, the first capacitor and the second capacitor are capacitor C3 and capacitor C4, respectively.

As a more specific example of connection, first switching circuit 2 is capable of a one-to-one connection of connecting each of capacitors to a different one of battery cells in parallel between battery cells B1 to B7 and capacitors C1 to C6. The one-to-one connection comprises at least two types that are a first connection state and a second connection state. The first connection state is different from the second connection state in pairs between the capacitors and the battery cells.

In the configuration example in FIG. 1, first switching circuit 2 includes switch elements Sa1 to Sa7 and switch elements Sb1 to Sb7. In other words, first switching circuit 2 is composed of switch elements Sa1 to Sa7 and Sb1 to Sb7 that selectively connect the terminals of battery cells B1 to B7 in assembled battery cells 1 to the terminals of capacitors C1 to C6. Each of the switch elements has a function to independently open and close in response to a signal from control circuit 4. In the first connection state, first switching circuit 2 respectively connects battery cells B1 to 36 to capacitors C1 to C6, In this case, switch elements Sa1 to Sa7 are on-state and switch elements Sb1 to Sb7 are off-state. In the second connection state, first switching circuit 2 respectively connects battery cells B2 to B7 to capacitors C1 to C6. In this case, switch elements Sa1 to Sa7 are off-state and switch elements Sb1 to Sb7 are on-state.

The first connection state here includes a parallel connection between the first capacitor and the first battery cell. The second connection state includes a parallel connection between the second capacitor and the first battery cell.

Second switching circuit 3 is capable of connecting the first capacitor and two or more series-connected battery cells other than the first battery cell in parallel. With the parallel connection, the first capacitor is charged with a voltage higher than the output voltage of one battery cell (e.g., an approximate sum of the output voltages of two or more battery cells).

Second switching circuit 3 is also capable of connecting the second capacitor and two or more series-connected battery cells other than the first battery cell in parallel. With the parallel connection, the second capacitor is charged with a voltage higher than the output voltage of one battery cell (e.g., an approximate sum of the output voltages of two or more battery cells). In other words, second switching circuit 3 performs an operation of increasing a charging current to the first capacitor or the second capacitor included in capacitor bank 6. Therefore, the configuration example of second switching circuit 3 in FIG. 1 includes switch elements Sp2 to Sp6 and Sq1 to Sq5 as well as resistances Rp2 to Rp6 and Rq1 to Rq5 that are respectively series-connected to these switch elements. Each of the switch elements is assumed to independently open and close in response to a signal from control circuit 4. Note that the term "parallel connection" used for an operation performed by first switching circuit 2 or second switching circuit 3 should include various cases such as a case where resistive elements for controlling a current are included in a switching circuit and a case where switch elements are included in a switching circuit, as illustrated in FIG. 1.

Control circuit 4 controls first switching circuit 2 and second switching circuit 3 to repeatedly switch between a connection by first switching circuit 2 and a connection by second switching circuit 3, Hereinafter, such control is referred to as a first control. In the first control, a voltage higher than the voltage of one battery cell is applied from the first capacitor or the second capacitor to the first battery cell. It is therefore possible to increase a charging current for the first battery cell in particular, thereby shortening a time required for balancing the voltages of the battery cells.

Control circuit 4 also performs a second control of repeatedly switching between the first connection state and the second connection state which are described above. The second control is performed to balance the voltages of battery cells B1 to B7 in assembled battery cells 1.

Furthermore, control circuit 4 also selects, as the first battery cell, for example, a battery cell having an output voltage less than a predetermined value, based on the output voltages of battery cells B1 to B7 detected by voltage detection circuit 5. The first battery cell is selected as a target battery cell for which a charging current is to be increased in a voltage balancing process.

Voltage detection circuit 5 is a circuit that detects the output voltage of each of battery cells B1 to B7 included in assembled battery cells 1. Note that voltage detection circuit 5 does not necessarily need to be provided inside battery management circuit 10, and may be provided outside battery management circuit 10 or energy storage device 100.

Note that battery management circuit 10 may be configured as an IC (a semiconductor integrated circuit). Battery management circuit 10 and capacitor bank 6 may be configured as a single printed circuit board (PCB).

Moreover, battery management circuit 10 may include a temperature measurement circuit that measures the temperature of assembled battery cells 1, and correct a voltage value detected by voltage detection circuit 5, in accordance with the temperature measured.

[2.1 Voltage Balancing Process (Second Control)]

Before explaining about the first control, the second control, that is, an operation of a voltage balancing process which does not increase the charging current of any of the battery cells will be described.

Figure 2A:
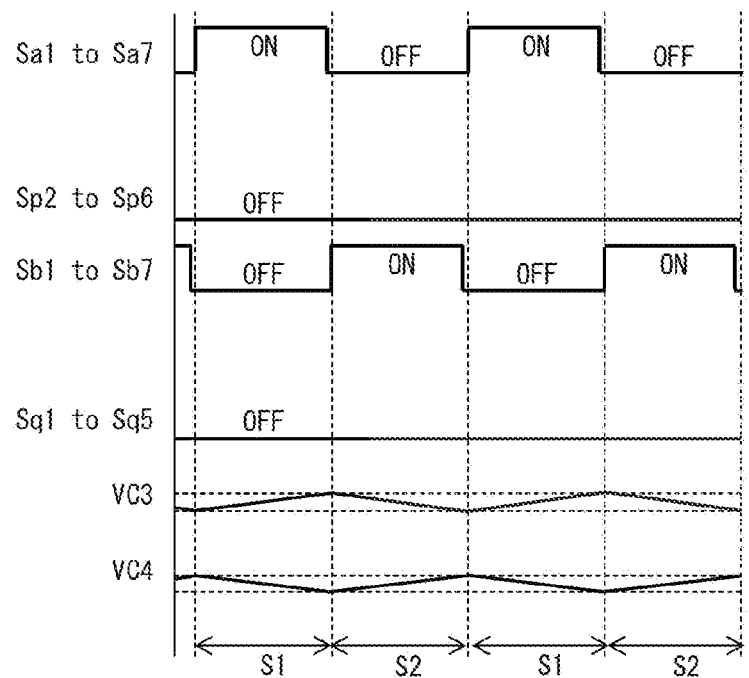
FIG. 2A is a time chart illustrating a second control, that is, a voltage balancing process in a battery management circuit.
Figure 2B:
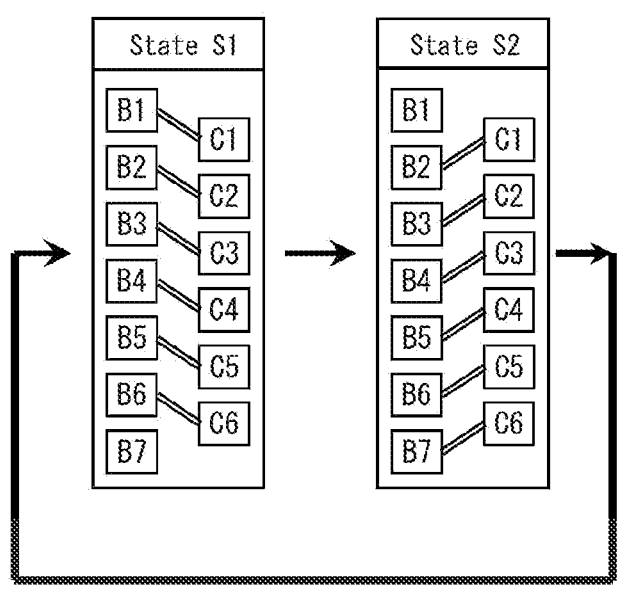
FIG. 2B is a diagram schematically illustrating two states in FIG. 2A.

FIG. 2A illustrates a time chart indicating the second control, that is, a voltage balancing process in battery management circuit 10. In FIG. 2A, the horizontal axis presents time and the vertical axis schematically presents the control signal of each of switch elements and changes in voltages VC3 and VC4 of capacitors C3 and C4. The control signal of each of the switch elements corresponds to on-state at a high level and to off-state at a low level. States S1 and S2 respectively correspond to the first connection state and the second connection state which are described above, FIG. 2B is a diagram schematically illustrating two states in FIG. 2A. Double lines in FIG. 2B indicate a pair of a battery cell and a capacitor that are connected to each other.

The second control is a normal operation mode for balancing voltages, and switch elements Sp2 to Sp6 and Sq1 to Sq5 in second switching circuit 3 are all off-state.

Figure 3:
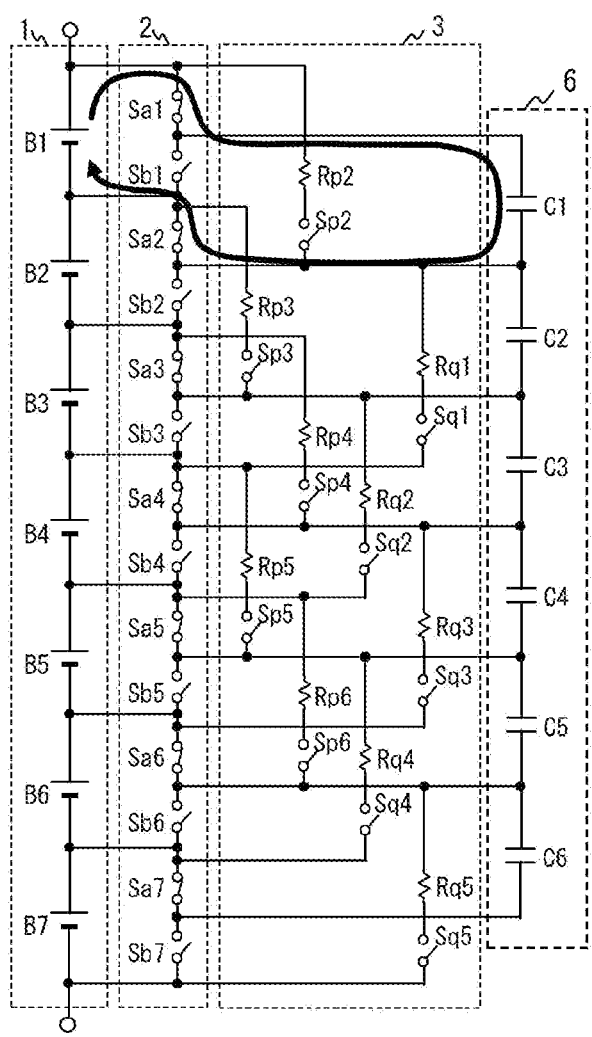
FIG. 3 is a circuit diagram illustrating a first connection state (state S1) in FIG. 2A.

FIG. 3 illustrates the state of each of the switch elements in the period of state S1 along the time axis in FIG. 2A. State S1 is a state in which switch elements Sa1 to Sa1 are on-state while all the other switch elements are off-state, and battery cells B1 to B6 are respectively connected to capacitors C1 to C6 in parallel, that is, the first connection state. The thick arrow in FIG. 3 particularly emphasizes a parallel connection between capacitor C1 and battery cell B1.

Figure 4:
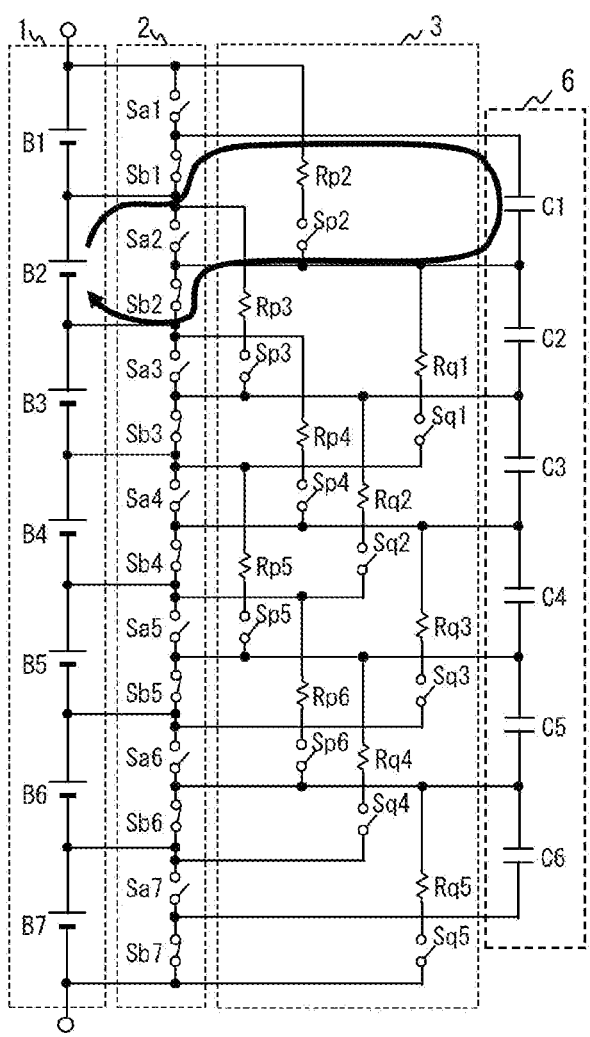
FIG. 4 is a circuit diagram illustrating a second connection state (state S2) in FIG. 2A.

FIG. 4 illustrates the state of each of the switch elements in the period of state S2 along the time axis in FIG. 2A. State S2 is a state in which switch elements Sb1 to Sb7 are on-state while all the other switch elements are off-state, and battery cells B2 to B7 are respectively connected to capacitors C1 to C6 in parallel, that is, the second connection state. The thick arrow in FIG. 4 particularly emphasizes a parallel connection between capacitor C1 and battery cell B2.

FIG. 2A illustrates, as an example, the operational principles of a voltage balancing process in the case where the voltage of battery cell B4 is lower than the voltage of battery cell B3 and the voltage of battery cell B5. In the first connection state, capacitor C3 is supplied with charges from battery cell B3 and voltage VC3 of capacitor C3 rises. Subsequently, in the second connection state, capacitor C3 supplies charges to battery cell B4 and voltage VC3 of capacitor C3 falls. At the same time, capacitor C4 is supplied with charges from battery cell B5 and voltage VC4 of capacitor C4 rises in the second connection state. Subsequently, in the first connection state, capacitor C4 supplies charges to battery cell B4 and voltage VC4 of capacitor C4 falls.

By thus repeating the switching between the first connection state and the second connection state in a predetermined cycle, charges are transferred, via a capacitor, from a battery cell having a high voltage to a battery cell having a low voltage. The transfer of the charges is repeated until the voltages of all the battery cells become equal, and it is thus possible to achieve the voltage balancing of the battery cells.

[2.2 Voltage Balancing Process with Increase in Charging Current (First Control)]

Next, the following describes the first control for shortening the voltage balancing process, that is, control performed to increase a charging current in the case where a battery cell having an output voltage lower than a predetermined value is present among the battery cells.

In the second control described above, that is, in a voltage balancing process, if a battery cell with a particularly low voltage is included in series-connected battery cells, an operation of repeating the switching between the first connection state and the second connection state alone takes time to charge that battery cell having a low voltage. This causes a problem that it takes time to balance the voltages of all the battery cells.

In order to solve this problem, the energy storage device according to the present disclosure includes: capacitors; first switching circuit 2 that selectively connects the terminal of each of the capacitors to the terminal of a different one of battery cells included in the energy storage device; second switching circuit 3 that increases the charging current of a capacitor selected among the capacitors; and control circuit 4 that controls the operations of first switching circuit 2 and second switching circuit 3. The energy storage device has a function to balance the voltages of the battery cells through the repetition of the switching between a first connection state and a second connection. The first connection state is a state in which each of the capacitors is connected to a different one of the battery cells. The second connection state is a state in which each of the capacitors is connected to a different one of the battery cells which is different from the one connected in the first connection state. The energy storage device also has a function to enable an increase in the charging current of the first battery cell selected among the battery cells, by increasing the charging current of a capacitor selected among the capacitors.

Control circuit 4 performs the first control of repeatedly switching between a connection by first switching circuit 2 and a connection by second switching circuit 3, as the function to increase the charging current of the first battery cell.

For example, in the control system of control circuit 4, a process period in which second switching circuit 3 performs connection is provided prior to both or one of the process periods of the first connection state and the second connection state.

For example, in the first control, control circuit 4 may switch among the first connection state, the second connection state, and the connection by second switching circuit 3.

For example, in the first control, control circuit 4 may switch in the order of the first connection state, the connection by second switching circuit 3, the second connection state, and the connection by second switching circuit 3.

For example, as the first control, control circuit 4 may repeatedly switch between (i) the first connection state or the second connection state by first switching circuit 2, and (ii) the connection by second switching circuit 3.

Second switching circuit 3 forms a circuit loop in which battery cells other than the selected first battery cell are selectively connected to a capacitor that has been selected.

Moreover, second switching circuit 3 is supplied with a current from series-connected battery cells adjacent to the selected first battery cell via switch elements and resistances each including the on-resistance of a corresponding one of the switch elements.

Furthermore, the following describes, with reference to FIG. 1 through FIG. 5, an operation which characterizes the energy storage device of the present disclosure and is performed when a function to accelerate the charging of the selected first battery cell (hereinafter referred to as a selected-cell charge acceleration mode) is in operation.

FIG. 1 illustrates an inner configuration of second switching circuit 3 according to an embodiment. Second switching circuit 3 includes the following series connections: a series connection of resistance Rp2 and switch element Sp2, between the positive terminal of battery cell B1 and the connection point of capacitors C1 and C2; a series connection of resistance Rp3 and switch element Sp3, between the positive terminal of battery cell B2 and the connection point of capacitors C2 and C3; a series connection of resistance Rp4 and switch element Sp4, between the positive terminal of battery cell B3 and the connection point of capacitors C3 and C4; a series connection of resistance Rp5 and switch element Sp5, between the positive terminal of battery cell B4 and the connection point of capacitors C4 and C5; and a series connection of resistance Rp6 and switch element Sp6, between the positive terminal of battery cell B5 and capacitors C5 and C6. Second switching circuit3 is also equipped with the following series connections: a series connection of resistance Rq1 and switch element Sq1, between the negative terminal of battery cell B3 and the connection point of capacitors C1 and C2; a series connection of resistance Rq2 and switch element Sq2, between the negative terminal of battery cell B4 and the connection point of capacitors C2 and C3; a series connection of resistance Rq3 and switch element Sq3, between the negative terminal of battery cell B5 and the connection point of capacitors C3 and C4; a series connection of resistance Rq4 and switch element Sq4, between the negative terminal of battery cell B6 and the connection point of capacitors C4 and C5; and a series connection of resistance Rq5 and switch element Sq5, between the negative terminal of battery cell B7 and the connection point of capacitors C5 and C6.

Figure 5:
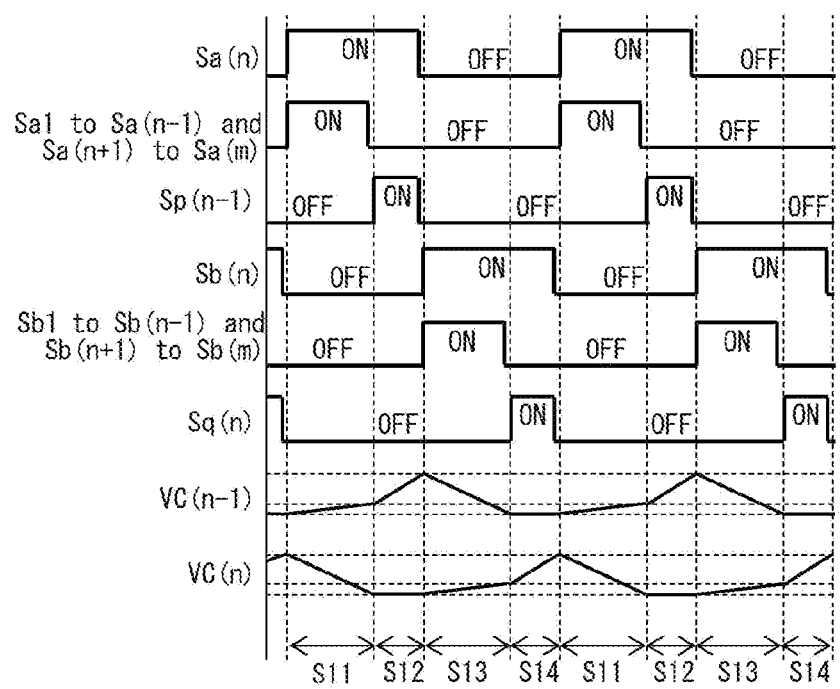
FIG. 5 is a time chart illustrating an operation of increasing a charging current in the case of using, as a first battery cell, the nth battery cell from the positive terminal side of m series-connected battery cells.

FIG. 5 illustrates a time chart indicating an operation of increasing a charging current (i.e., an operation performed in the first control) in the case of using, as the first battery cell, the nth battery cell from the positive terminal side of m series-connected battery cells. In FIG. 5, assuming the case where n=4 and m=7, Sa(n) presents the state of switch element Sa4, Sa1 to Sa(n−1) present the states of switch elements Sa1 to Sa3, and Sa(n+1) to Sa(m) present the states of switch elements Sa5 to Sa1. Sp(n−1) presents the state of switch element Sp3. Sb(n) presents the state of switch element Sb4, Sb1 to Sb(n−1) present the states of switch elements Sb1 to Sb3, and Sb(n+1) to Sb(m) present the states of switch elements Sb5 to Sb7. Sq(n) presents the state of switch element Sq4. When n is a natural number in the range from 3 to m−3, alphabets or mathematical expressions in parentheses may be transformed into actual numbers, as in the above. Note that the case where a battery cell for which a charging current is to be increased is located near either end of the assembled battery cells, such as the case where n is 1, 2, m−1, or m, will be described later. In FIG. 5, it is controlled such that states S11, S12, S13, and S14 are repeated in this order. States S11 and S13 among states S11 to S14 are respectively the same as states S1 and S2 in the second control (the voltage balancing process) illustrated in FIG. 2A or FIG. 2B. The first control in FIG. 5 is equivalent to the operation generated by adding states S12 and S14 after states S1 and S2, respectively, in the second control illustrated in FIG. 2A.

State S12 indicates a connection by second switching circuit 3, and the first capacitor and two or more series-connected battery cells other than the first battery cell are connected in parallel. In the example in FIG. 5, the first capacitor is capacitor C(n−1), Accordingly, voltage VC(n−1) of the first capacitor is increased to a voltage higher than the output voltage of one battery cell. In state S13 following state S12, the first capacitor is connected to the first battery cell. Accordingly, a charging current from the first capacitor to the first battery cell is increased.

State S14 indicates a connection by second switching circuit 3, and the second capacitor and two or more series-connected battery cells other than the first battery cell are connected in parallel. In FIG. 5, the second capacitor is capacitor C(n). Accordingly, voltage VC(n) of the second capacitor is increased to a voltage higher than the output voltage of one battery cell. In state S11 following state S14, the second capacitor is connected to the first battery cell. Accordingly, a charging current from the second capacitor to the first battery cell is increased.

By thus providing states S12 and S14 the first capacitor and the second capacitor each holding the increased voltage supplies the first battery cell with the increased charging current in respective states 13 and S11. Accordingly, it is possible to increase a charging current for the first battery cell, thereby shortening a time required for balancing the voltages of the battery cells.

FIG. 5 has illustrated a change in the operational state of battery management circuit 10 without specifying the numerical values of m and n. Next, a more specific example will be described with reference to FIG. 6A through FIG. 10.

Figure 6A:
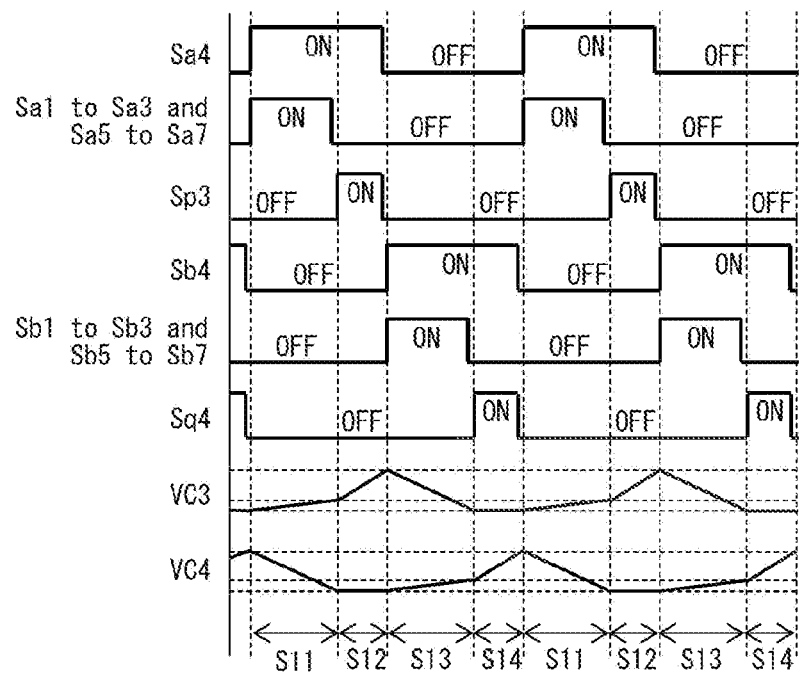
FIG. 6A is a time chart illustrating an operation of increasing a charging current in the case of using, as the first battery cell, the fourth battery cell from the positive terminal side of seven series-connected battery cells in a first switching circuit.
Figure 6B:
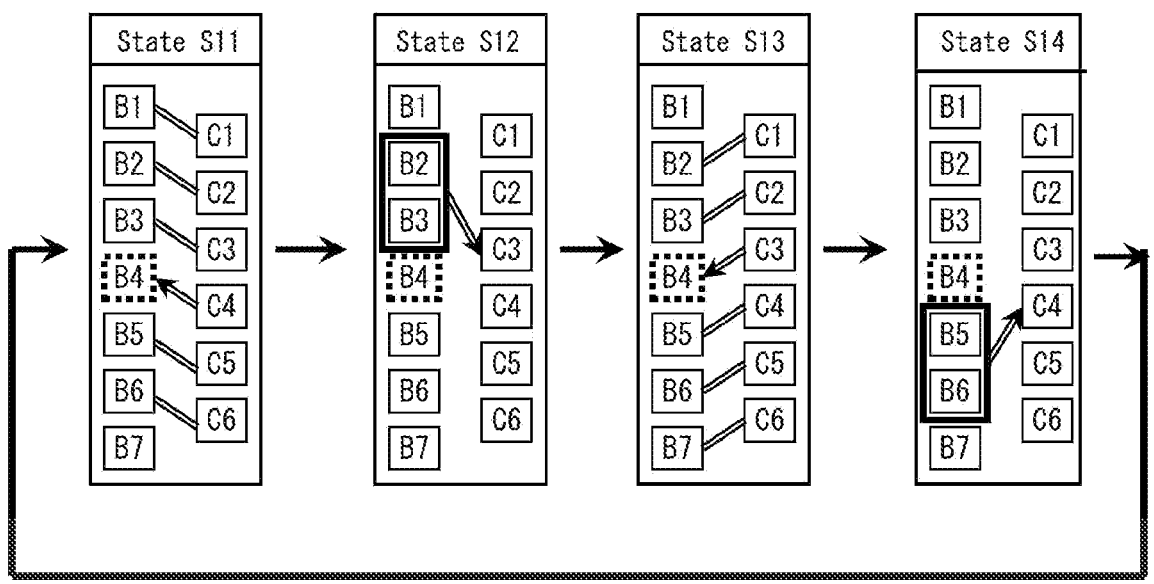
FIG. 6B is a diagram schematically illustrating four states in FIG. 6A.

FIG. 6A illustrates a time chart indicating the operation of first switching circuit 2 where m=7 and n=4. FIG. 6B is a diagram schematically illustrating four states in FIG. 6A. Double lines in FIG. 6B indicate a pair of a battery cell and a capacitor that are connected to each other. A dotted rectangular frame indicates the first battery cell. A thick rectangular frame indicates two or more series-connected battery cells other than the first battery cell. In FIG. 6A and FIG. 6B, battery cell B4 is the first battery cell and capacitors C3 and C4 are the first capacitor and the second capacitor, respectively.

Figure 7:
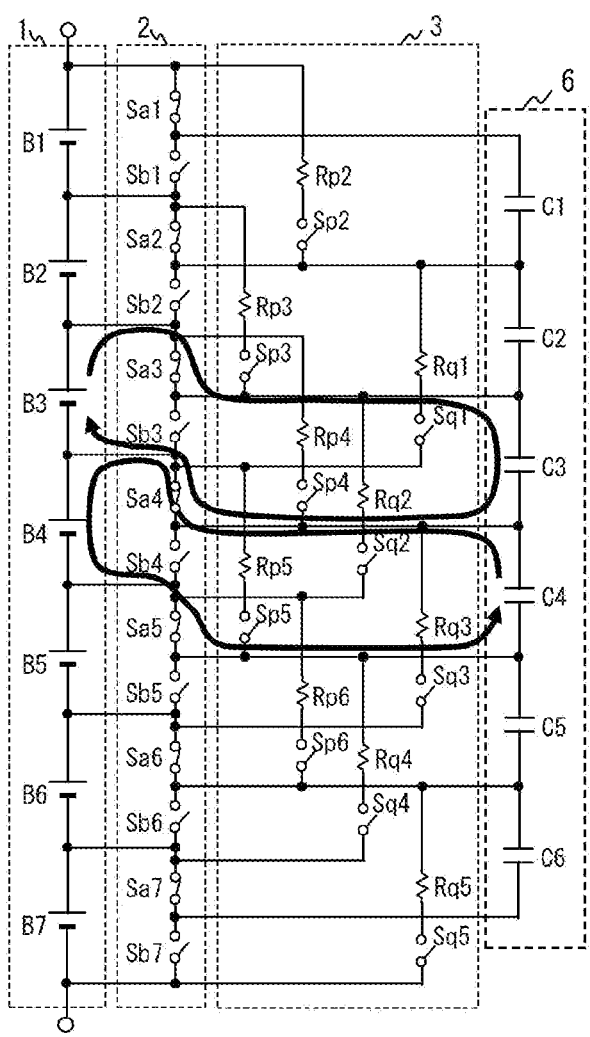
FIG. 7 is a circuit diagram illustrating a first state in FIG. 6A.

FIG. 7 illustrates the states of switch elements in the period of state S11 along the time axis in FIG. 6A. The following state is defined as a first connection state: switch elements Sa1 to Sa7 are on-state while all the other switch elements are off-state; and battery cells B1 to B6 are respectively connected to capacitors C1 to C6 in parallel. This connection state is the same as the first connection state in the aforementioned second control. The thick arrows written into FIG. 7 each shows a loop of a current related to the charging of battery cell B4 that has been selected. In accordance with a relationship with an end voltage in the previous process in a sequence of processes that is repeated, capacitor C3 is supplied with charges from battery cell B3, and at the same time, capacitor C4 supplies battery cell B4 with charges. The waveforms of voltages VC3 and VC4 in FIG. 6A indicate changes in the voltages of capacitor C3 and capacitor C4, and voltage VC3 rises while voltage VC4 falls in the period of state S11 along the time axis.

Figure 8:
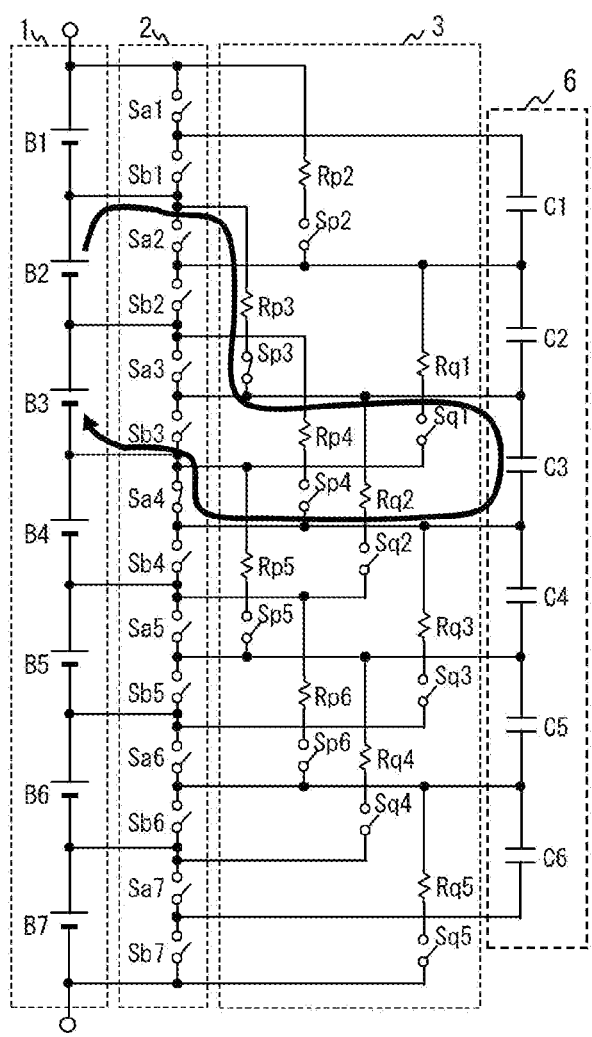
FIG. 8 is a circuit diagram illustrating a second state in FIG. 6A.

Next, FIG. 8 illustrates the states of the switch elements in the period of state S12 along the time axis in FIG. 6A. In this process, only capacitor C3 that has been selected is charged with a voltage higher than an end voltage in the previous process. The following state is defined as a second connection state: switch elements Sa4 and Sp3 are on-state while all the other switch elements are off-state; and the voltage of the series-connection of battery cells B2 and B3 is applied to the series connection part of resistance Rp3, switch element Sp3, and capacitor C3. In the second connection state, since the voltage of the series-connection of battery cells B2 and B3 is higher than the value of the voltage of capacitor C3 which is stored in the first connection state that is the previous process, the current flows in the direction indicated by the thick arrow written into FIG. 8, and voltage VC3 of capacitor C3 rises. On the other hand, the voltages of the capacitors other than capacitor C3 are held since there is no path for the current to flow. In the period of state S12 along the time axis, voltage VC3 rises with a slope steeper than that in the period of state S11 while voltage VC4 is held, as illustrated by the waveforms of voltages VC3 and VC4 in FIG. 6A.

Figure 9:
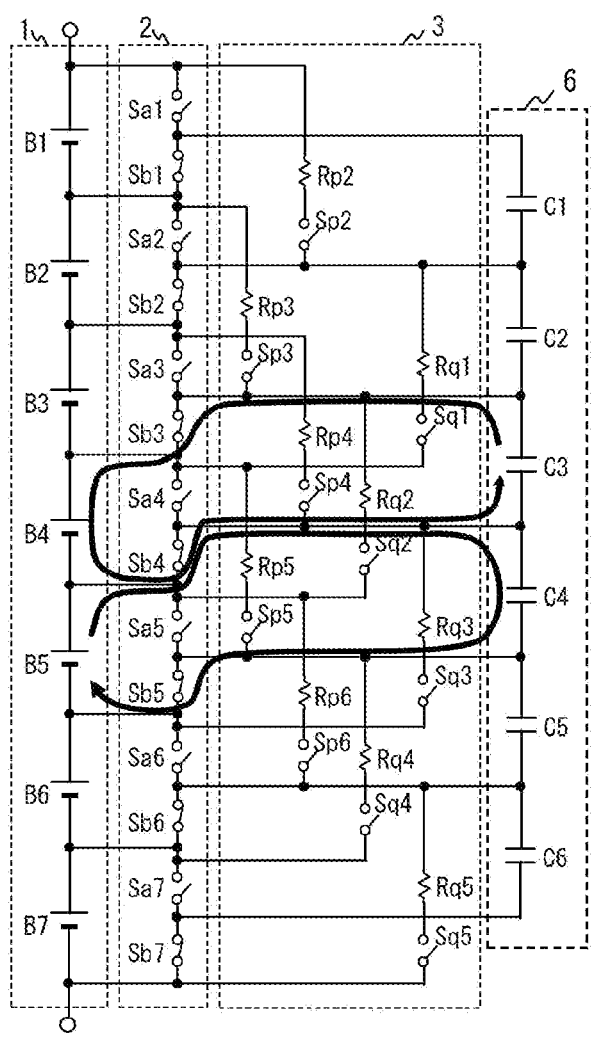
FIG. 9 is a circuit diagram illustrating a third state in FIG. 6A.

Next, FIG. 9 illustrates the states of the switch elements in the period of state S13 along the time axis in FIG. 6A. The following state is defined as a third connection state: switch elements Sb1 to Sb7 are on-state while all the other switch elements are off-state; and battery cells B2 to 37 are respectively connected to capacitors C1 to C6 in parallel. This connection state is the same as the second connection state in the aforementioned second control. The thick arrow written into FIG. 9 indicates a loop of a current related to the charging of selected battery cell B4. In accordance with a relationship with an end voltage in the previous process, capacitor C4 is supplied with charges from battery cell B5, and at the same time, capacitor C3 supplies battery cell B4 with charges. As illustrated in the waveforms of voltages VC3 and VC4 in FIG. 6A, voltage VC4 rises while voltage VC3 falls in the period of state S13 along the time axis. Since capacitor C3 is charged with a high voltage in the second connection state that is the previous process, a charging current flowing to battery cell B4 is increased more than a case without the second connection state.

Figure 10:
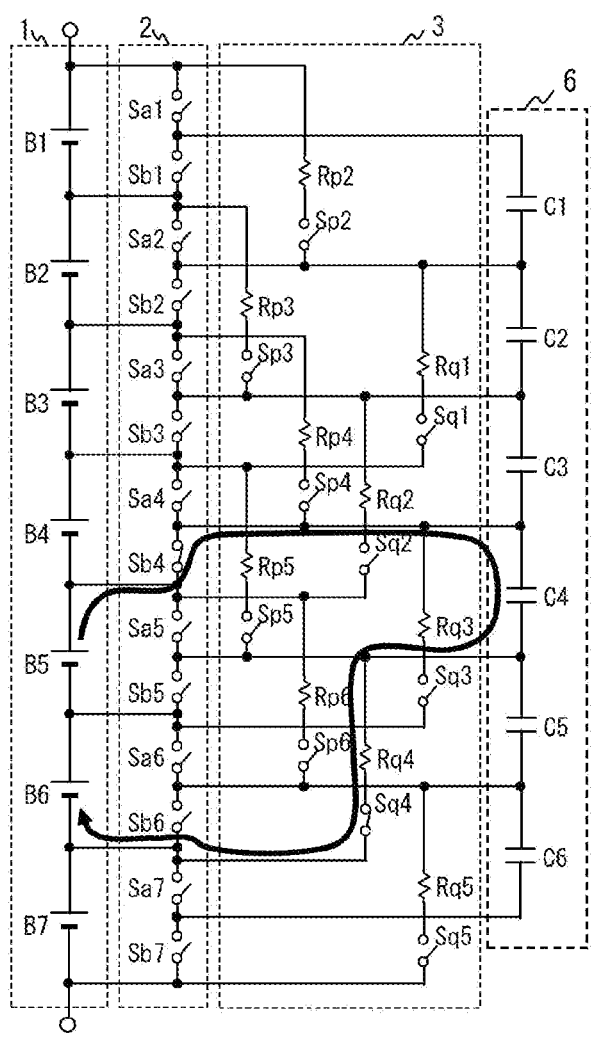
FIG. 10 is a circuit diagram illustrating a fourth state in FIG. 6A.

Next, FIG. 10 illustrates the states of the switch elements in the period of state S14 along the time axis in FIG. 6A, In this process, only capacitor C4 is charged with a voltage higher than an end voltage in the previous process. The following state is defined as a fourth connection state: switch elements Sb4 and Sq4 are on-state while all the other switch elements are off-state; and the voltage of the series-connection of battery cells B5 and B6 is applied to the series connection part of capacitor C3, resistance Rq4, and switch element Sq4. In the fourth connection state, since the voltage of the series-connection of battery cells B5 and B6 is higher than the value of the voltage of capacitor C4 which is stored in the third connection state that is the previous process, the current flows in the direction indicated by the thick arrow written into FIG. 10 and voltage VC4 of capacitor C4 rises. On the other hand, the voltages of the capacitors other than capacitor C4 are held since there is no path for the current to flow. In the period of state S14 along the time axis, voltage VC4 rises with a slope steeper than that in the period of state S13 while voltage VC3 is held, as illustrated by the waveforms of voltages VC3 and VC4 in FIG. 6A.

As illustrated in FIG. 6A, the next process following the fourth connection state returns to the first connection state. Since capacitor C4 is charged with a high voltage in the fourth connection state that is the previous process, a charging current flowing to battery cell B4 is increased more than a case without the fourth connection state. By repeating such a sequence of processes, it is possible to increase the charging current of the selected first battery cell.

In the circuit example of energy storage device 100 illustrated in FIG. 1, in a selected-cell charge acceleration mode, since battery cells, which are adjacent and second adjacent to the selected first battery cell on the both sides of the selected first battery cell, supply charges to the selected first battery cell, the voltages of the adjacent and second adjacent battery cells fall. However, these adjacent battery cells are supplied with charges from the third and the subsequent adjacent battery cells of the selected first battery cell on the both sides of the selected first battery cell, the voltage falls are less steep. Moreover, voltage balancing is performed between (i) the third and the subsequent adjacent battery cells of the selected first battery cell on the both sides of the selected first battery cell and (ii) the fourth and the subsequent adjacent battery cells of the selected first battery cell on the both sides of the selected first battery cell. Accordingly, the selected-cell charge acceleration mode simultaneously enables a function to increase the charging current of the selected first battery cell in parallel with a function to balance the voltages of the other battery cells at the same time. However, if the selected-cell charge acceleration mode continues, the voltage of the selected first battery cell keeps rising to reach an over-charging state. It is therefore desirable to switch the selected-cell charge acceleration mode to a normal operation mode (i.e., the second control) after the voltage of the selected first battery cell has approached the voltage of the other battery cells. The energy storage device according to the present disclosure is thus capable of readily switching the selected-cell charge acceleration mode to the normal operation mode merely by stopping the operation of second switching circuit 3 without making any influence at all.

[2.3 Another Voltage Balancing Process with Increase in Charging Current (First Control)]

Next, an operation performed in the case where the first battery cell for which a charging current is to be increased by the first control will be described with reference to FIG. 11A through FIG. 15.

Figure 11A:
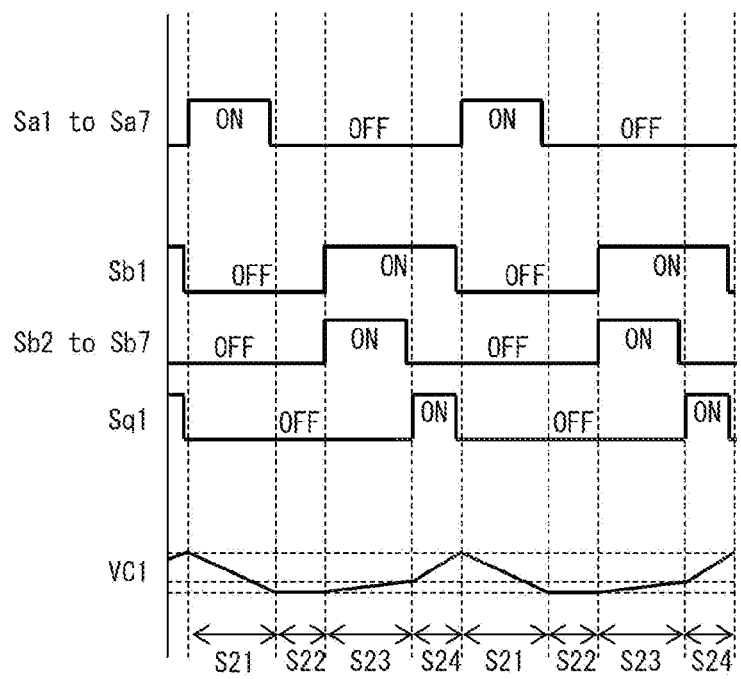
FIG. 11A illustrates (i) a time chart indicating a change in the operational state of a switching circuit in the case of increasing the charging current of a battery cell by a first control in the battery management circuit, and (ii) the voltage waveform of a capacitor that has increased the charging current.
Figure 11B:
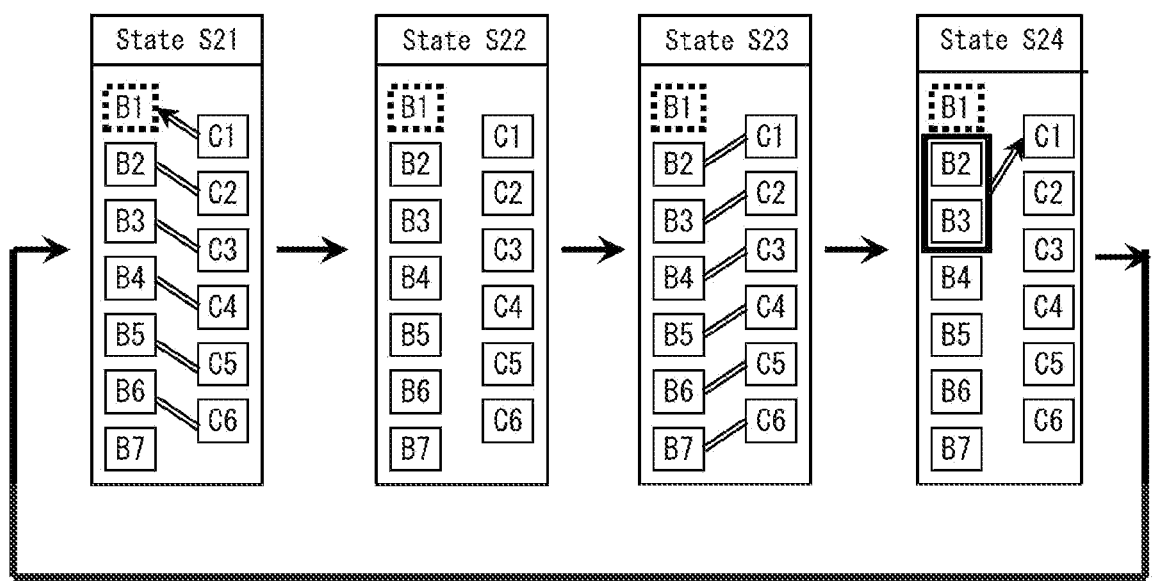
FIG. 11B is a diagram schematically illustrating four states in FIG. 11A.

FIG. 11A is a flow chart illustrating an operation of increasing a charging current in the case of using, as the first battery cell, battery cell B1 located at the top in assembled battery cells 1 in first switching circuit 2. In other words, the flow chart shows the case where m=7 and n=1. FIG. 11B is a diagram schematically illustrating four states in FIG. 11A.

Figure 12:
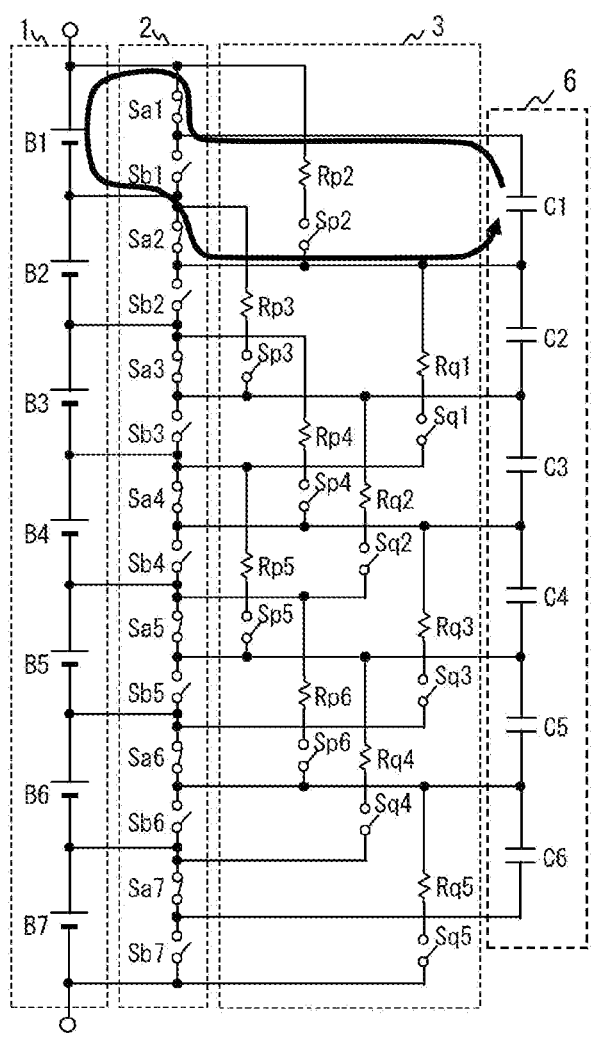
FIG. 12 is a circuit diagram illustrating a first state in FIG. 11A.

FIG. 12 illustrates the states of switch elements in the period of state S21 along the time axis in FIG. 11A. The diagram shows the first connection state in which switch elements Sa1 to Sa1 are on-state while all the other switch elements are off-state, and battery cells B1 to B6 are respectively connected to capacitors C1 to C6 in parallel. The thick arrow written into FIG. 12 indicates a loop of a current related to the charging of battery cell B1 that has been selected. Capacitor C1 supplies battery cell B1 with charges in accordance with a relationship with an end voltage in the previous process in a sequence of processes that is repeated. The waveform of voltage VC1 in FIG. 11A indicates a change in the voltage of capacitor C1, and voltage VC1 falls in the period of state S21 along the time axis.

Figure 13:
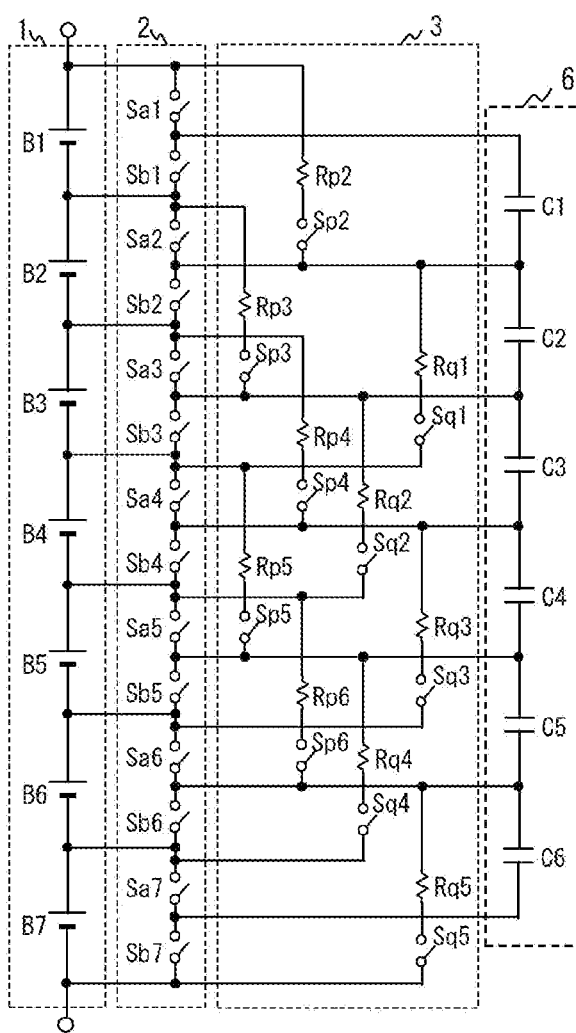
FIG. 13 is a circuit diagram illustrating a second state in FIG. 11A.

Next, FIG. 13 illustrates the states of the switch elements in the period of state S22 along the time axis in FIG. 11A. The diagram shows the second connection state in which all of the switch elements are turned to off-state. In this process, since all of the switch elements are off-state, the current flows nowhere and the voltages of all the capacitors are held.

Figure 14:
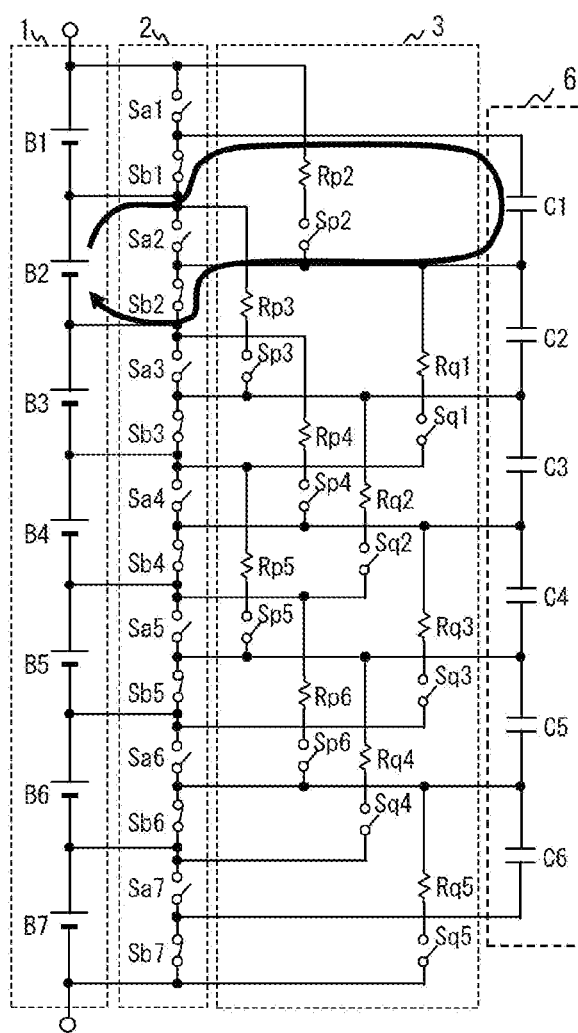
FIG. 14 is a circuit diagram illustrating a third state in FIG. 11A.

Next, FIG. 14 illustrates the states of the switch elements in the period of state S23 along the time axis in FIG. 11A. The diagram shows the third connection state in which switch elements Sb1 to Sb7 are on-state while all the other switch elements are off-state, and battery cells B2 to B7 are respectively connected to capacitors C1 to C6 in parallel. The thick arrow written into FIG. 14 indicates a loop of a current related to the charging of selected battery cell B1, Capacitor C1 is supplied with charges from battery cell B2 in accordance with a relationship with an end voltage in the previous process. As illustrated in the waveform of voltage VC1 in FIG. 11A, voltage VC1 rises in the period of state S23 along the time axis.

Figure 15:
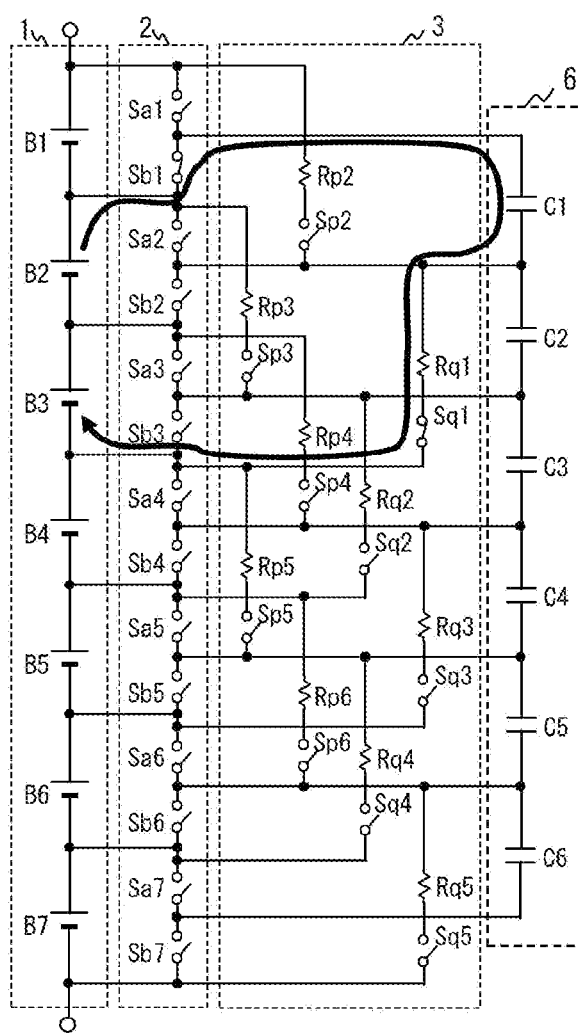
FIG. 15 is a circuit diagram illustrating a fourth state in FIG. 11A.

Next, FIG. 15 illustrates the states of the switch elements in the period of state S24 along the time axis in FIG. 11A. In this process, only capacitor C1 that has been selected is charged with a voltage higher than an end voltage in the previous process. The diagram shows the fourth connection state in which switch elements Sb1 and Sq1 are on-state while all the other switch elements are off-state, and the voltage of the series connection of battery cells B2 and B3 is applied to the series connection part of capacitor C1, resistance Rq1, and switch element Sq1. In the fourth connection state, since the voltage of the series connection of battery cells B2 and B3 is higher than the value of the voltage of capacitor C1 which is stored in the third connection state that is the previous process, the current flows in the direction of the thick arrow written into FIG. 15 and voltage VC1 of capacitor C1 rises. On the other hand, the voltages of the capacitors other than capacitor C1 are held since there is no path for the current to flow. As illustrated in the waveform of voltage VC1 in FIG. 11A, voltage VC1 rises in the period of state S24 along the time axis with a slope steeper than that in the period of state S23.

As illustrated in FIG. 11A, the next process following the fourth connection state returns to the first connection state. Since capacitor C1 is charged with a high voltage in the fourth connection state that is the previous process, a charging current that flows to battery cell B1 is increased more than a case without the fourth connection state.

By repeating such a sequence of processes, it is possible to increase the charging current of the selected battery cell, thereby shortening the charging time.

The aforementioned case of increasing the charging current of battery cell B4 enables supplying charges from two battery cells on each side of battery cell B4 that is a total of four battery cells B2, B3, B5, and B6, using time for the second and fourth connection states. However, in the case of increasing the charging current of battery cell B1 located at the edge of assembled battery cells 1, since battery cell B1 is charged from two battery cells B2 and B3 on one side of battery cell B1 using only time for the fourth connection state, an amount of increase in the charging current of the selected battery cell becomes half if the same conditions are set for a current that flows to a capacitor that has been selected. A way to address this problem is to change an amount of current to be increased by second switching circuit 3, according to the position of the selected first battery cell in an order of connecting battery cells in assembled battery cells 1. As a specific example, in the case of increasing the charging current of battery cell B1, the resistance value of resistance Rq1 is reduced to half the resistance value of resistance Rp3 or resistance Rq3. Thus, the amount of voltage rise of capacitor C1 increases in the fourth connection state, and this can increase an amount of increase in the charging current of battery cell B1, thereby increasing the charging current of battery cell B1 for the same amount as increased in the case of increasing the charging current of battery cell B4.

In the circuit example of energy storage device 100 illustrated in FIG. 1, by setting the resistance values of resistances Rq1, Rq2, Rp5, Rp6 to be lower than those of resistances Rp2, Rp3, Rq3, and Rq4 in preparation for the case of increasing the charging current of battery cell B1, B2, B6, or B7, it is possible to obtain the same amount of increase in the charging current as that obtained in the case of increasing the charging current of battery cell B3, B4, or B5.

By thus changing an amount of current to be increased by second switching circuit 3, according to the position of the selected first battery cell in an order of connecting battery cells in assembled battery cells 1, it is possible to equalize an amount of increase in the charging current to the first battery.

[2.4 Another Voltage Balancing Process with Increase in Charging Current (First Control)]

In the first control described above, that is, control performed to increase a charging current to the first battery cell, battery cells disposed near the first battery cell may run out as a result of providing a current for an increase in the charging current. The following describes an example of an operation that can reduce the consumption of the battery cells adjacent to the first battery cell.

Figure 16A:
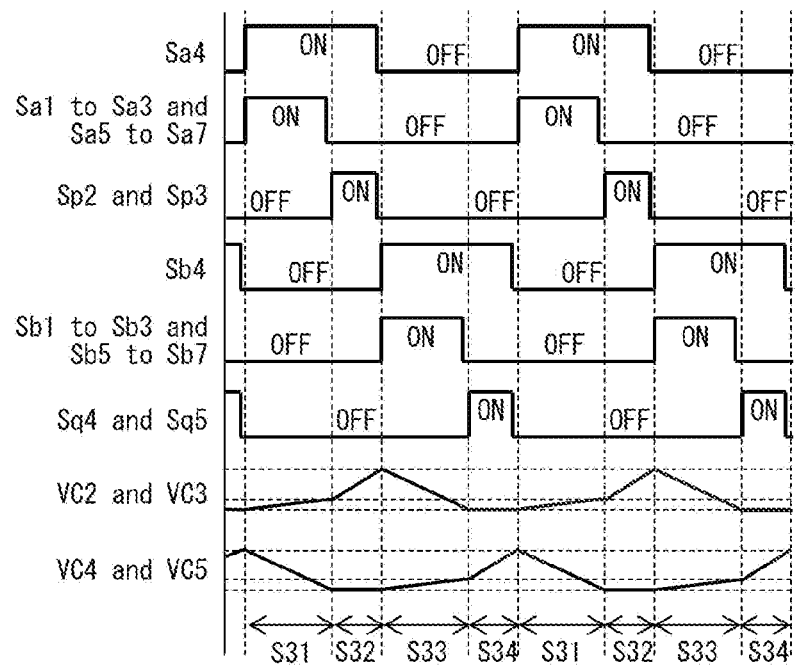
FIG. 16A is a time chart illustrating an operation of increasing the charging current of a battery cell by the first control in the battery management circuit.
Figure 16B:
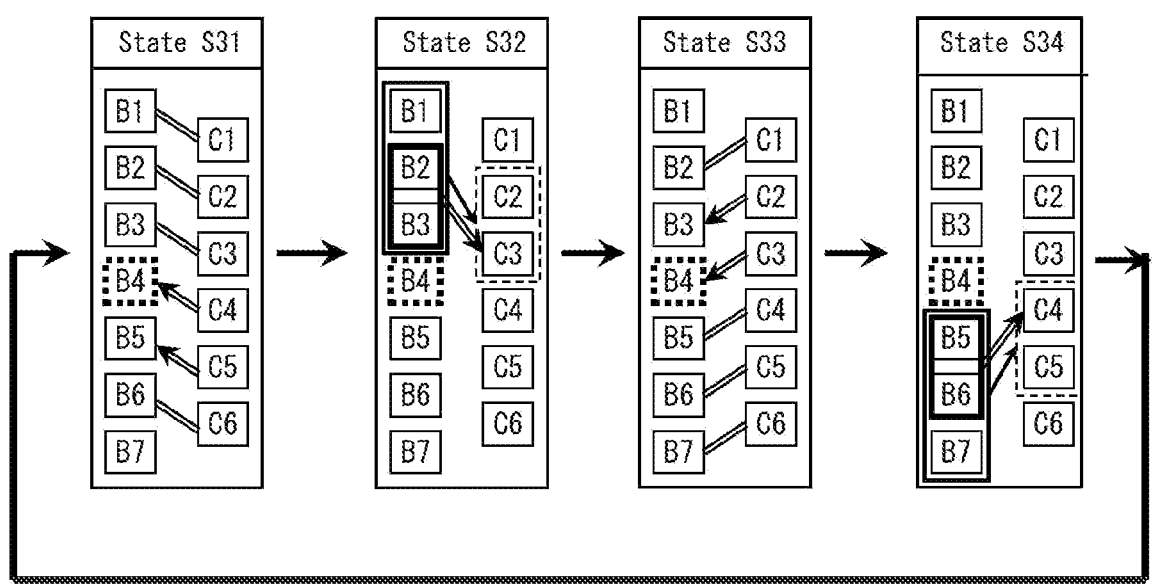
FIG. 16B is a diagram schematically illustrating four states in FIG. 16A.

FIG. 16A illustrates a time chart indicating an operation performed by first switching circuit 2 in the case where m=7 and n=4. FIG. 16B is a diagram schematically illustrating four states in FIG. 16A. Double lines indicate a pair of a battery cell and a capacitor that are connected to each other. A dotted rectangular frame indicates the first battery cell. A thick rectangular frame indicates two series-connected battery cells other than the first battery cell. A solid rectangular frame indicates three series-connected battery cells other than the first battery cell. A dashed frame indicates two series-connected capacitors for which an applied voltage is increased. In FIG. 16A and FIG. 16B, battery cell B4 is the first battery cell, and capacitors C3 and C4 are the first capacitor and the second capacitor, respectively.

The states of switch elements in the period of state S31 along the time axis in FIG. 16A are the same as those already described with reference to FIG. 7. The following state is defined as a first connection state: switch elements Sa1 to Sa1 are on-state while all the other switch elements are off-state; and battery cells B1 to B6 are respectively connected to capacitors C1 to C6 in parallel. This connection state is the same as the first connection state in the aforementioned second control. The thick arrows written into FIG. 7 each shows a loop of a current related to the charging of battery cell B4 that has been selected. In accordance with a relationship with an end voltage in the previous process in a sequence of processes that is repeated, capacitor C3 is supplied with charges from battery cell B3, and at the same time, capacitor C4 supplies battery cell B4 with charges. In FIG. 16A, the waveform of voltages VC2 and VC3 indicates changes in the voltages of capacitors C2 and C3, and the waveform of voltages VC4 and VC5 indicates changes in the voltages of capacitors C4 and C5. Voltages VC2 and VC3 rise while voltages VC4 and VC5 fall in the period of state S31 along the time axis. Thus, in state S31, not only battery cell B4 which is the first battery cell whose output voltage has decreased, but also battery cell B5 adjacent to battery cell B4 is supplied with a charging current that has been increased.

Figure 17:
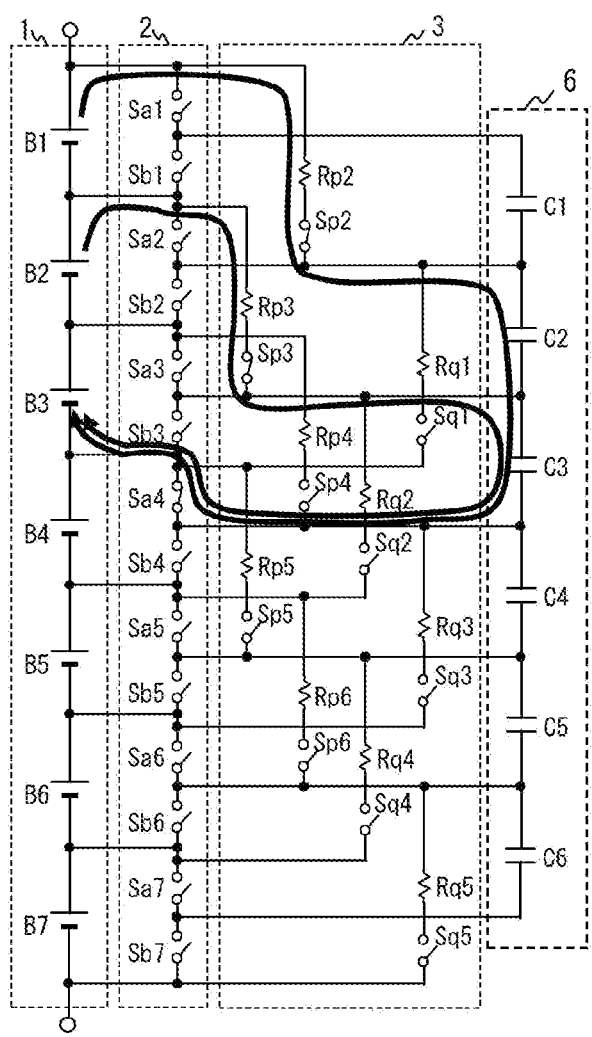
FIG. 17 is a circuit diagram illustrating a second state in FIG. 16A.

Next, FIG. 17 illustrates the states of the switch elements in the period of state S32 along the time axis in FIG. 16A. In this process, capacitor C3 that has been selected is charged with a voltage higher than an end voltage in the previous process, and capacitor C2 is also charged with a high voltage. The following state is defined as a second connection state: switch elements Sa4, Sp2, and Sp3 are on-state while all the other switch elements are off-state; the voltage of the series connection of battery cells B2 and 63 is applied to the series connection part of resistance Rp3, switch element Sp3, and capacitor C3; and the voltage of the series connection of battery cells B1, B2, and B3 is applied to the series connection part of resistance Rp2, switch element Sp2, capacitor C2, and capacitor C3. In the second connection state, since the voltage of the series connection of battery cells B2 and B3 is higher than the value of the voltage of capacitor C3 which is stored in the first connection state that is the previous process, the current flows in the direction of the inner thick arrow written into FIG. 17 and voltage VC3 of capacitor C3 rises. At the same time, since the voltage of the series connection of battery cells B1, B2, and B3 is higher than the total amount of the voltages of capacitors C2 and C3 which are stored in the first connection state that is the previous process, the current flows in the direction of the outer thick arrow written into FIG. 17 and voltage VC2 of capacitor C2 rises. On the other hand, the voltages of the capacitors other than capacitors C2 and C3 are held since there is no path for the current to flow. As illustrated in the waveform of voltage VC2 and voltage VC3 in FIG. 16A, voltage VC2 and voltage VC3 rise in the period of state S32 along the time axis with a slope steeper than that in the period of state S31.

Next, the states of the switch elements in the period of state S33 along the time axis in FIG. 16A are the same as those already described with reference to FIG. 9. The following state is defined as a third connection state: switch elements Sb1 to Sb7 are on-state while all the other switch elements are off-state; and battery cells B2 to B7 are respectively connected to capacitors C1 to C6 in parallel. This connection state is the same as the second connection state in the aforementioned second control. The upper thick arrow written into FIG. 9 shows a loop of a current related to the charging of selected battery cell B4, and capacitor C3 supplies battery cell B4 with a charging current that has been increased. At the same time, capacitor C2 supplies battery cell B3 with a charging current that has been increased. As illustrated in the waveform of voltage VC2 and voltage VC3 in FIG. 16A, voltage VC2 and voltage VC3 fall in the period of state S33 along the time axis. Since each of capacitors C2 and C3 has been charged with a high voltage in the second connection state that is the previous process, a charging current that flows to each of battery cell B3 and battery cell B4 is increased more than a case without the second connection state. Thus, in state S33, not only battery cell B4 which is the first battery cell whose output voltage has decreased, but also battery cell B3 adjacent to battery cell B4 is supplied with the charging current that has been increased.

Figure 18:
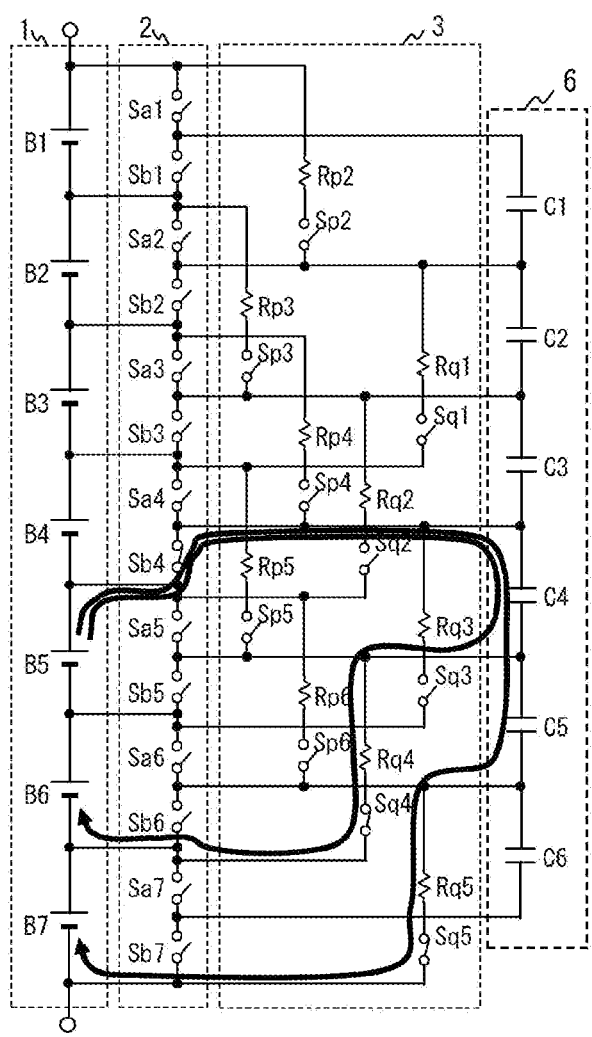
FIG. 18 is a circuit diagram illustrating a fourth state in FIG. 16A.

Next, FIG. 18 illustrates the states of the switch elements in the period of state S34 along the time axis in FIG. 16A. In this process, capacitor C4 that has been selected is charged with a voltage higher than an end voltage in the previous process, and capacitor C5 is also charged with a voltage higher than the end voltage in the previous process. The following state is defined as a fourth connection state: switch elements Sb4, Sp4, and Sq5 are on-state while all the other switch elements are off-state; the voltage of the series connection of battery cells B5 and B6 is applied to the series connection parts of capacitor C4, resistance Rq4, and switch element Sq4; and the voltage of the series connection of battery cells B5, B6, and B7 is applied to the series connection parts of capacitor C4, capacitor C5, resistance Rq6, and switch element Sq5. In the fourth connection state, since the voltage of the series connection of battery cells B5 and B6 is higher than the value of the voltage of capacitor C4 which is stored in the third connection state that is the previous process, the current flows in the direction of the inner thick arrow written into FIG. 18 and voltage VC4 of capacitor C4 rises. At the same time, in the fourth connection state, since the voltage of the series connection of battery cells B5, B6, and B7 is higher than the total amount of the voltages of capacitors C4 and C5 which are stored in the third connection state that is the previous process, the current flows in the direction of the outer thick arrow written into FIG. 18 and voltage VC5 of capacitor C5 rises. On the other hand, the voltages of the capacitors other than capacitors C4 and C5 are held since there is no path for the current to flow. As illustrated in the waveform of voltage VC4 and voltage VC5 in FIG. 16A, voltage VC4 and voltage VC5 rise in the period of state S34 along the time axis with a slope steeper than that in the period of state S33.

As illustrated in FIG. 16A and FIG. 16B, the next process following the fourth connection state returns to the first connection state described above. Since capacitors C4 and C5 are each charged with a high voltage in the fourth connection state that is the previous process, a charging current that flows to battery cells B4 and B5 in the first connection state is increased more than a case without the fourth connection state. Thus, in state S31, not only battery cell B4 which is the first battery cell whose output voltage has decreased, but also battery cell B5 adjacent to battery cell B4 is supplied with the charging current that has been increased.

By repeating such a sequence of processes, it is possible to increase the charging current of the selected first battery cell. In addition, the method of increasing the charging current of the first battery cell (the first control) described with reference to FIG. 16A and FIG. 16B increases also a charging current for a battery cell disposed near the first battery cell. Therefore, it is possible to reduce the consumption of battery cells disposed near the first battery cell and keep a good voltage balance among the battery cells.

(Variations)

Figure 19:
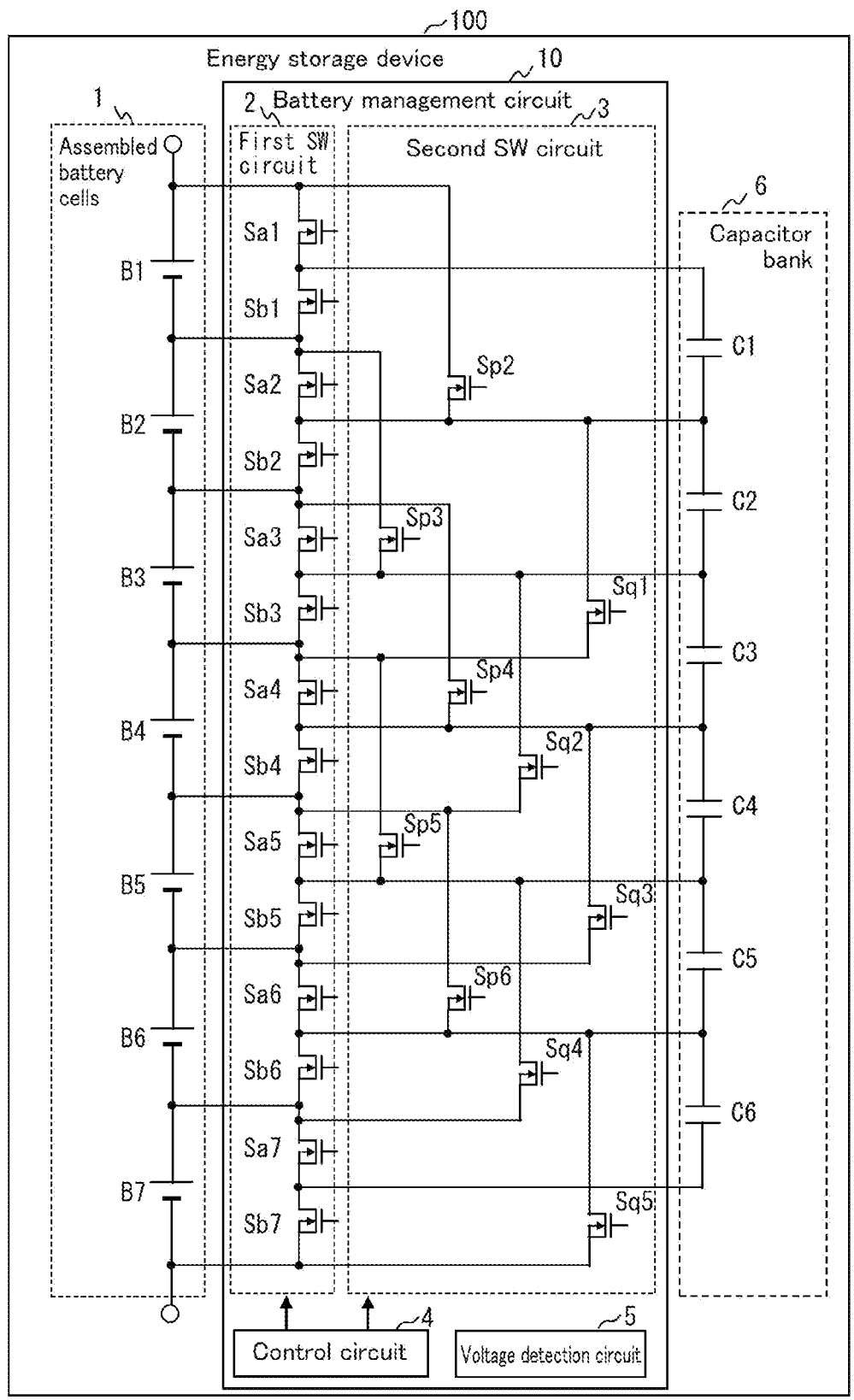
FIG. 19 is a diagram illustrating an example of a circuit diagram of an energy storage device according to a variation of the embodiment.

FIG. 19 is a diagram illustrating an example of a circuit diagram of energy storage device 100 according to a variation of the embodiment. The switch elements in the diagram are each configurable by a MOS field effect transistor (MOSFET), A resistance that is series-connected to each of the switch elements in second switching circuit 3 in FIG. 1 is replaced with the on-resistance of the corresponding MOSFET in FIG. 19. The aforementioned settings for changing an amount of current to be increased by second switching circuit 3, according to the position of the selected first battery cell in an order of connecting battery cells in assembled battery cells 1 can be optimized by changing the on-resistance of any of the MOSFETs in FIG. 19. Note that in the case of using a semiconductor integrated circuit (IC), the on-resistance of a MOSFET to be embedded in the IC can be flexibly determined by the settings of a gate length and a gate width.

As has been described above, battery management circuit 10 according to an embodiment of the present disclosure is battery management circuit 10 that manages energy storage device 100 including battery cells B1 to B7 and capacitors C1 to C6, and includes: first switching circuit 2 that connects a first capacitor and a first battery cell in parallel, where the first capacitor is included in capacitors C1 to C6 and the first battery cell is included in battery cells B1 to B7; second switching circuit 3 that connects the first capacitor and two or more series-connected battery cells other than the first battery cell in parallel, where the two or more series-connected battery cells are included in battery cells B1 to B7; and control circuit 4 that performs a first control of repeatedly switching between the connection by first switching circuit 2 and the connection by second switching circuit 3.

Accordingly, a voltage higher than the voltage of one battery cell is applied from the first capacitor to the first battery cell. Therefore, it is possible to increase a charging current particularly for the first battery cell, thereby shortening a time required for balancing the voltages of the battery cells.

The first battery cell may be a battery cell having an output voltage lower than a predetermined value among the battery cells.

Accordingly, it is possible to shorten a time required for voltage recovery for a battery cell having an output voltage lower than a predetermined value.

Control circuit 4 may select, as the first battery, a battery cell having an output voltage lower than a predetermined value or a battery cell having the lowest output voltage among the battery cells. Moreover, control circuit 4 may sequentially select, as the first battery cell, one battery cell from the battery cells.

First switching circuit 2 may have, between the battery cells and the capacitors, (i) a first connection state in which each of the capacitors is connected to a different one of the battery cells in parallel, and (ii) a second connection state in which each of the capacitors is connected to a different one of the battery cells in parallel in a pair different from a pair in the first connection state, and control circuit 4 may further perform a second control of repeatedly switching between the first connection state and the second connection state.

In the first control, control circuit 4 switches among the first connection state, the second connection state, and the connection by second switching circuit 3.

Accordingly, it is possible to increase a charging current to the first battery cell in parallel with an operation of balancing the voltages of the battery cells in the first control.

In the first control, control circuit 4 may switch in the order of the first connection state, the connection by second switching circuit 3, the second connection state, and the connection by second switching circuit 3.

Accordingly, it is possible to increase a charging current to the first battery cell in parallel with an operation of balancing the voltages of the battery cells in the first control.

As the first control, control circuit 4 may repeatedly switch between (i) the first connection state or the second connection state by first switching circuit 2 and (ii) the connection by second switching circuit 3.

The first connection state may include a parallel connection between the first capacitor and the first battery cell. The second connection state may include a parallel connection between a second capacitor and the first battery cell, where the second capacitor is included in the capacitors. Second switching circuit 3 may have: a third connection state in which the first capacitor and two or more series-connected battery cells other than the first battery cell are connected in parallel, where the two or more series-connected battery cells are included in the battery cells; and a fourth connection state in which the second capacitor and two or more series-connected battery cells other than the first battery cell are connected in parallel, where the two or more series-connected battery cells are included in the battery cells. As the first control, control circuit 4 may sequentially switch in the order of the first connection state, the third connection state, the second connection state, and the fourth connection state.

Accordingly, it is possible to perform, in parallel, voltage balancing among the battery cells and increasing a charging current to the first battery cell, and to perform the voltage balancing with a good balance.

The two or more series-connected battery cells other than the first battery cell may include a battery cell that is adjacent to and series-connected to the first battery cell.

Second switching circuit 3 may include a switch element, and the switch element may form a circuit loop for connecting the first capacitor and two or more series-connected battery cells other than the first battery cell in parallel, where the two or more series-connected battery cells are included in the battery cells.

The circuit loop may include a resistive element for controlling a current that flows in the circuit loop.

Accordingly, it is possible to suppress overcharging due to an increase in the charging current.

Second switching circuit 3 may include switch elements for connecting each of the capacitors to two or more series-connected battery cells in parallel in a one-to-multiple connection between the battery cells and the capacitors, where the two or more series-connected battery cells are included in the battery cells. The switch elements may form circuit loops for connecting one of the capacitors and two or more series-connected battery cells in parallel, where the two or more series-connected battery cells are included in the battery cells.

Each of the switch elements may be a transistor having on-resistance for controlling a current that flows in a corresponding one of the circuit loops. The value of on-resistance of a switch element in a first circuit loop may be different from a value of on-resistance of a switch element in another circuit loop, where the first circuit loop and the other circuit loop are included in the circuit loops.

Accordingly, it is possible to appropriately set the amount of a charging current to be increased, for example, in accordance with the arrangement of series-connected battery cells.

Battery management circuit 10 according to an aspect of the present disclosure is battery management circuit 10 that manages energy storage device 100 including battery cells B1 to B7 and capacitors C1 to C6, and includes: first switching circuit 2 that performs one-to-one connection of connecting each of the capacitors to a different one of the battery cells in parallel between the battery cells and the capacitors; second switching circuit 3 that performs one-to-multiple connection of connecting one of the capacitors to two or more series-connected battery cells in parallel between the battery cells and the capacitors, where the two or more series-connected battery cells are included in the battery cells; and control circuit 4 that selectively performs (i) a first control of repeatedly switching between the connection by first switching circuit 2 and the connection by second switching circuit 3, and (ii) a second control of repeatedly switching between a first connection state in which the one-to-one connection is performed and a second connection state in which the one-to-one connection is performed in a pair different from a pair in the first connection state.

Accordingly, the first control of applying a voltage higher than the voltage of one battery cell and the second control of balancing the voltages of battery cells are selectively performed. It is possible to increase a charging current particularly in the first control, thereby shortening a time required for balancing the voltages of the battery cells.

Control circuit 4 may select, as a first battery cell, a battery cell having an output voltage lower than a predetermined value among the battery cells. The one-to-one connection may include a parallel connection between a first capacitor and the first battery cell, where the first capacitor is included in the capacitors. The one-to-multiple connection may include a parallel connection between the first capacitor and two or more series-connected battery cells other than the first battery cell among the battery cells.

In the first control, control circuit 4 may cause first switching circuit 2 and second switching circuit 3 to insert, between the first connection state and the second connection state, a state in which second switching circuit 3 performs the one-to-multiple connection.

Second switching circuit 3 may have: a third connection state including a parallel connection between the first capacitor and two or more series-connected battery cells other than the first battery cell among the battery cells; and a fourth connection state including a parallel connection between a second capacitor and two or more series-connected battery cells other than the first battery cell among the battery cells, where the second capacitor is included in the capacitors. As the first control, control circuit 4 may sequentially and repeatedly switch in the order of the first connection state, the third connection state, the second connection state, and the fourth connection state.

Energy storage device 100 includes battery management circuit 10, the battery cells, and the capacitors which are described above.

Accordingly, a voltage higher than the voltage of one battery cell is applied from the first capacitor to the first battery cell, Therefore, it is possible to increase a charging current particularly for the first battery cell, thereby shortening a time required for balancing the voltages of the battery cells.

Although battery management circuit 10 and energy storage device 100 according to one or more aspects of the present disclosure have been described based on embodiments, the present disclosure is not limited to the embodiments. Various modifications to the embodiments which may be conceived by those skilled in the art, as well as embodiments resulting from arbitrary combinations of elements from different embodiments are included within the scope of the one or more aspects so long as they do not depart from the essence of the present disclosure.

The invention claimed is:

1. A battery management circuit that manages an energy storage device including battery cells and capacitors, the battery management circuit comprising:
   a first switching circuit that connects a first capacitor and
      a first battery cell in parallel, the first capacitor being included in the capacitors, the first battery cell being included in the battery cells;

a second switching circuit that connects the first capacitor and two or more series-connected battery cells other than the first battery cell in parallel, the two or more series-connected battery cells being included in the battery cells; and a control circuit that performs a first control of repeatedly switching between the connection by the first switching circuit and the connection by the second switching circuit, wherein:

the first switching circuit has, between the battery cells and the capacitors, (i) a first connection state in which each of the capacitors is connected to a different one of the battery cells in parallel, and (ii) a second connection state in which each of the capacitors is connected to a different one of the battery cells in parallel in a pair different from a pair in the first connection state, and the control circuit further performs a second control of repeatedly switching between the first connection state and the second connection state, and wherein:

the first connection state includes a parallel connection between the first capacitor and the first battery cell, the second connection state includes a parallel connection between a second capacitor and the first battery cell, the second capacitor being included in the capacitors, the second switching circuit has:

a third connection state in which the first capacitor and two or more series-connected battery cells other than the first battery cell are connected in parallel, the two or more series-connected battery cells being included in the battery cells; and a fourth connection state in which the second capacitor and two or more series-connected battery cells other than the first battery cell are connected in parallel, the two or more series-connected battery cells being included in the battery cells, and as the first control, the control circuit sequentially switches in an order of the first connection state, the third connection state, the second connection state, and the fourth connection state.

2. The battery management circuit according to claim 1, wherein the first battery cell is a battery cell having an output voltage lower than a predetermined value among the battery cells.

3. The battery management circuit according to claim 1, wherein as a different mode of the first control, the control circuit switches among the first connection state, the second connection state, and the connection by the second switching circuit.

4. The battery management circuit according to claim 1, wherein as a different mode of the first control, the control circuit switches in an order of the first connection state, the connection by the second switching circuit, the second connection state, and the connection by the second switching circuit.

5. The battery management circuit according to claim 1, wherein as a different mode of the first control, the control circuit repeatedly switches between (i) the first connection state or the second connection state by the first switching circuit and (ii) the connection by the second switching circuit.

6. The battery management circuit according to claim 1, wherein the two or more series-connected battery cells other than the first battery cell include a battery cell that is adjacent to and series-connected to the first battery cell.

7. The battery management circuit according to claim 1, wherein the second switching circuit includes a switch element, and the switch element forms a circuit loop for connecting the first capacitor and two or more series-connected battery cells other than the first battery cell in parallel, the two or more series-connected battery cells being included in the battery cells.

8. The battery management circuit according to claim 7, wherein the circuit loop includes a resistive element for controlling a current that flows in the circuit loop.

9. The battery management circuit according to claim 1, wherein the second switching circuit includes switch elements for connecting each of the capacitors to two or more series-connected battery cells in parallel in a one-to-multiple connection between the battery cells and the capacitors, the two or more series-connected battery cells being included in the battery cells, and the switch elements form circuit loops for connecting one of the capacitors and two or more series-connected battery cells in parallel, the two or more series-connected battery cells being included in the battery cells.

10. The battery management circuit according to claim 9, wherein each of the switch elements is a transistor having on-resistance for controlling a current that flows in a corresponding one of the circuit loops, and a value of on-resistance of a switch element in a first circuit loop is different from a value of on-resistance of a switch element in an other circuit loop, the first circuit loop and the other circuit loop being included in the circuit loops.

11. An energy storage device comprising:
the battery management circuit according to claim 1;
the battery cells; and
the capacitors.

12. A battery management circuit that manages an energy storage device including battery cells and capacitors, the battery management circuit comprising:

a first switching circuit that performs one-to-one connection of connecting each of the capacitors to a different one of the battery cells in parallel between the battery cells and the capacitors;

a second switching circuit that performs one-to-multiple connection of connecting one of the capacitors to two or more series-connected battery cells in parallel between the battery cells and the capacitors, the two or more series-connected battery cells being included in the battery cells; and a control circuit that selectively performs (i) a first control of repeatedly switching between the connection by the first switching circuit and the connection by the second switching circuit, and (ii) a second control of repeatedly switching between a first connection state in which the one-to-one connection is performed and a second connection state in which the one-to-one connection is performed in a pair different from a pair in the first connection state, wherein:

the control circuit selects, as a first battery cell, a battery cell having an output voltage lower than a predetermined value among the battery cells, the one-to-one connection includes a parallel connection between a first capacitor and the first battery cell, the first capacitor being included in the capacitors, and the one-to-multiple connection includes a parallel connection between the first capacitor and two or more series-connected battery cells other than the first battery cell among the battery cells, and wherein:

the second switching circuit has:

a third connection state including a parallel connection between the first capacitor and two or more series-connected battery cells other than the first battery cell among the battery cells; and a fourth connection state including a parallel connection between a second capacitor and two or more series-connected battery cells other than the first battery cell among the battery cells, the second capacitor being included in the capacitors, and as the first control, the control circuit sequentially and repeatedly switches in an order of the first connection state, the third connection state, the second connection state, and the fourth connection state.

13. The battery management circuit according to claim 12, wherein in the first control, the control circuit causes the first switching circuit and the second switching circuit to insert, between the first connection state and the second connection state, a state in which the second switching circuit performs the one-to-multiple connection.

\* \* \* \* \*